(12) United States Patent
Long et al.

(10) Patent No.: US 6,728,238 B1
(45) Date of Patent: Apr. 27, 2004

(54) DYNAMIC ALLOCATION OF VOICE AND DATA CHANNELS IN A TIME DIVISION MULTIPLEXED TELECOMMUNICATIONS SYSTEM

(75) Inventors: Gary E. Long, Loveland, CO (US); Eric M. DeLangis, Berthoud, CO (US)

(73) Assignee: Remote Switch Systems, Inc., Loveland, CO (US)

( * ) Notice: Subject to any disclaimer, the term of this patent is extended or adjusted under 35 U.S.C. 154(b) by 0 days.

(21) Appl. No.: 09/465,899

(22) Filed: Dec. 17, 1999

(Under 37 CFR 1.47)

Related U.S. Application Data

(63) Continuation of application No. 09/305,389, filed on May 5, 1999.
(60) Provisional application No. 60/120,094, filed on Feb. 16, 1999, and provisional application No. 60/084,486, filed on May 6, 1998.

(51) Int. Cl.[7] .............................................. H04L 12/66
(52) U.S. Cl. ........................ 370/352; 370/463; 370/353; 370/355; 370/356
(58) Field of Search ................................ 370/431, 437, 370/442, 443, 458, 459, 463, 464, 468, 498, 536, 352, 353, 355, 356

(56) References Cited

U.S. PATENT DOCUMENTS

| 3,304,372 A | | 2/1967 | Filipowsky et al. ........ 370/493 |
| 3,660,606 A | | 5/1972 | DeWitt ........................ 370/299 |
| 4,764,919 A | * | 8/1988 | Hunter et al. ............... 370/259 |
| 5,313,467 A | * | 5/1994 | Varghese et al. ........... 370/94.1 |

(List continued on next page.)

Primary Examiner—Alpus H. Hsu
Assistant Examiner—Michael J Molinari
(74) Attorney, Agent, or Firm—The Law Offices of William W. Cochran, LLC

(57) ABSTRACT

A system for dynamic allocation of voice and data channels in a time division multiplexed telecommunication system is disclosed. Multiple time division multiplexed lines are provided between a Teleco central office and a number of remote terminals. The time division multiplexing provides multiple channels on each of the multiple DSL lines so that multiple POTS devices can be connected to a single remote terminal. In addition, the remote terminal provides a high speed data port for connection to a data device such as a computer, a router, a bridge, a switch or other similar devices. The multiple TDM channels on each DSL line are allocated so that all of the channels are available for transmission of voice signals and all of the remaining open channels are available for the transmission of data signals. Open available channels are allocated for the transmission of data packets only during the duration of the transmission time of the data packet to minimize the delay in allocation of channels for the transmission of voice signals. The Teleco central office includes a central office terminal controller that is under the control of a CPU that routes voice signals to the central office switch and data signals to an Ethernet interface. The CPU of the central office terminal controller also routes data from external sources to the appropriate line card for transmission on the correct DSL line to the destination remote terminal. Voice signals from the central office switch are also routed by the CPU to the correct line card for transmission on the proper DSL line to the remote terminal connected to the destination POTS device. The POTS devices can comprise telephones, fax machines, or modems. Data devices transmit and receive data packets such as Ethernet data packets. High data transfer rates are possible since the data packets that are sent and received by the data devices are distributed over all of the open, available channels that are not being used by the POTS devices. Subscribers can subscribe to a preset number of channels to meet the subscriber's voice and data transmission needs. The number of available channels can be programmed by central office personnel through an administrative and maintenance terminal.

10 Claims, 15 Drawing Sheets

U.S. PATENT DOCUMENTS

| | | | |
|---|---|---|---|
| 5,384,766 A | | 1/1995 | Yamato et al. ............... 370/244 |
| 5,526,350 A | | 6/1996 | Gittins et al. ............... 370/468 |
| 5,533,108 A | | 7/1996 | Harris et al. ............ 379/211.02 |
| 5,592,477 A | | 1/1997 | Farris et al. ................ 370/396 |
| 5,610,910 A | * | 3/1997 | Focsaneanu et al. ........ 370/351 |
| 5,610,922 A | | 3/1997 | Balatoni ..................... 370/468 |
| 5,636,218 A | | 6/1997 | Ishikawa et al. ............ 370/401 |
| 5,638,363 A | | 6/1997 | Gittins et al. ............... 370/358 |
| 5,699,356 A | * | 12/1997 | Beever et al. .............. 370/329 |
| 5,841,777 A | * | 11/1998 | Cohen ........................ 370/443 |
| 5,867,494 A | * | 2/1999 | Krishnaswamy et al. ... 370/352 |
| 6,011,794 A | * | 1/2000 | Mordowitz et al. ......... 370/389 |
| 6,026,087 A | * | 2/2000 | Mirashrafi et al. .......... 370/389 |
| 6,101,182 A | * | 8/2000 | Sistanizadeh et al. ....... 370/352 |
| 6,128,335 A | * | 10/2000 | Liu et al. .................... 375/220 |
| 6,130,879 A | * | 10/2000 | Liu ............................. 370/230 |
| 6,141,339 A | * | 10/2000 | Kaplan et al. ......... 370/395.61 |
| 6,229,810 B1 | * | 5/2001 | Gerszberg et al. .......... 370/401 |
| 6,282,208 B1 | * | 8/2001 | Bowcutt et al. ............ 370/486 |
| 6,307,839 B1 | * | 10/2001 | Gerszberg et al. .......... 370/235 |
| 6,307,853 B1 | * | 10/2001 | Storch et al. ............... 370/354 |
| 6,393,017 B1 | * | 5/2002 | Galvin et al. ............... 370/352 |

* cited by examiner

DYNAMIC ALLOCATION OF VOICE AND DATA CHANNELS IN A TIME DIVISION MULTIPLEXED TELECOMMUNICATIONS SYSTEM

A. CROSS REFERENCE TO RELATED APPLICATIONS

This application claims the benefit of provisional application Ser. No. 60/084,486, filed May 6, 1998, entitled "DEPLOYING MIXED VOICE AND DATA SERVICES IN THE LOCAL LOOP," provisional application Ser. No. 60/120,094 filed Feb. 16, 1999, entitled "DYNAMIC ALLOCATION OF VOICE AND DATA CHANNELS IN A TIME DIVISION MULTIPLEXED TELECOMMUNICATIONS SYSTEM" and continuation application Ser. No. 09/305,389, filed May 5, 1999, entitled "DYNAMIC ALLOCATION OF VOICE AND DATA CHANNELS IN A TIME DIVISION MULTIPLEXED TELECOMMUNICATIONS SYSTEM."

BACKGROUND OF THE INVENTION

B. Field of Invention

The present invention pertains generally to telecommunications and more specifically to time domain multiplexed channels on a single twisted pair.

C. Description of the Background

Telecommunications have grown rapidly over the past few years due to the increasing availability and ease of use of the Internet. Telecommunications companies, particularly local exchange carriers (LECs), i.e., local telephone companies, have experienced growing pains due to the substantial increase in demand for new services. This demand for new services has been created in large part by small customers that obtain data services by attaching to the Internet through analog modems. When a user is attached to the Internet via an analog modem, the local telephone company switch (voice switch) has to allocate a channel for the duration of the call. The analog modem uses tone signals that are generated over a twisted pair that are digitized by the telephone switch at the central office. The use and allocation of voice switches has been based on a model of typical calling patterns for voice calls during peak calling hours before the advent of the Internet. While the average phone call only runs approximately 3 minutes on average, the average Internet connection runs 20 minutes, with the average Internet user being connected to the Internet for 23 hours per month. As more users tie up telephone switches with analog modem data traffic, the number of available channels for voice calls diminishes drastically. This has forced the Telecos to add a great deal of switch capacity in order to meet the required grade of service as defined by the Public Utilities Commission, which is approximately 99.8% availability. Not only have the Telecos been required to outlay significant sums for capital improvement by adding switch capacity, the problem is further exacerbated by the fact that the cost of the new switching equipment is not offset by increased revenue because Internet users are tying up the switches for analog modem data traffic by making local calls which fall under the basic monthly fee for the telephone line. As a result, the profit of Telecos is stagnant or falling with respect to these services.

The voice switch systems used by the local exchange carriers (Telecos or LECs) digitize the tone data emanating from the voice of a speaker, or a modem, to produce a digital signal that can be transmitted through the public switch telephone network (PSTN). These voice switches are designed to maintain a constant connection between the talking parties. This is because it is difficult to carry on a conversation when a voice is not continuous. People perceive subtleties in the nuances of speech. If the voice channel deletes segments of this information, the users have difficulty in carrying on conversations.

Data networks operate in a completely different fashion. A constant open channel is not required to transmit data. Data is bursty by nature and it is relatively insignificant if small delays occur in the transmission of data packets in that the overall data transmission rate is not reduced by packetizing the data transmissions. Data networks are designed to make maximum use of the network by sending data on any available path it can find to a destination and receiving that data in any order and reorganizing it in the proper order. In other words, a portion of a file can be routed through one network path while another portion is routed through a totally different path, with different pieces arriving in an order that is different from the way the data was sent. When the data is received at the other end of the network, the network equipment reassembles the data into the original order. Clearly, voice data cannot be transmitted in this fashion.

The public switch telephone network (PSTN) has used T-1 data services for many years. T-1 is a digital transmission system that was developed to carry digitized voice signals and was later adapted to also carry pure data signals. The T-1 methodology of using clear channels, i.e., dedicated open channels, to carry digitized voice signals is necessary, as indicated above, for carrying these voice signals, but is extremely wasteful of bandwidth when used to carry data. T-1 services were initially offered with full T-1 bandwidth, i.e., 24 channels. As a result, only large corporations could afford the cost of T-1 systems. New services, such as fractional T-1 and frame relay, take advantage of the bursty nature of data to provide lower cost data services over the T-1 infrastructure. These services have brought the cost of T-1 systems down to a level where much smaller companies can afford to link their internal corporate data network with the outside world.

Data networks, such as local area networks (LANs) are typically based on Ethernet, which is a data packet protocol that was designed to transfer data between computers. These networks were not designed to provide voice services as pointed out above. Ethernet has become a de facto corporate network standard because of its low cost and its backwards compatibility with slower predecessors. A need therefore arose to interface these data networks with the PSTN to allow the seamless transmission of data from a local network over the telecommunications system. To meet these needs, bridges and routers were developed that provide the interconnection between the data networks and the PSTN. The bridges and routers perform the data conversions necessary to communicate and transfer data over these incompatible systems.

Although T-1 systems have been modified to provide less expensive services that are affordable for small corporations, a need has existed for even less expensive digital services that are affordable for small businesses and homeowners. ISDN has attempted to fill that need. However, ISDN services have been expensive to implement because these services have required the installation of ISDN digital line cards at the central office (CO) and expensive digital telephones for special terminal adapters at the customer's premises. As a result, ISDN services have been slow to be deployed in the U.S. In less developed countries where the national telecommunications infrastructure was not fully developed, a significant capital investment was made in ISDN and it has been adopted to a large extent. However, in the U.S., few customers were willing to pay the high cost to change their existing telephone systems for ISDN systems. The cost factor has been exacerbated by the lack of services which the Telecos were providing for ISDN. The high cost factor associated with implementing ISDN, plus the fact that the Internet was not in common use at the time ISDN was first implemented, rendered ISDN a solution to a problem that had not yet been created in the U.S. ISDN is capable of providing 144 Kbps. In the 1970s, 1980s, and early 1990s, this high bandwidth digital service (144 Kbps) was not needed by most customers and their data needs were satisfied by inexpensive standard analog modems which were used to transmit documents via fax. One benefit that has accrued from development of ISDN services is that it has employed 2B1Q coding which is compatible with AMI line coding format that is used in T-1 services. Both of these services can be run in the same wire bundles without causing interference. This is not the case with newer coding formats such as CAP and DMT that are being proposed for the higher speed ADSL systems that run in excess of 8 Mbps.

Due to the lack of widespread adoption of ISDN, the telecommunications industry is leapfrogging this technology to adopt a much faster technology known as Digital Subscriber Line service (DSL). Typical DSL technologies are able to provide data services at data rates ranging from 768 Kbps (HDSL) to rates in excess of 8 Mbps (ADSL, SDSL, and MDSL). The 56 k analog modems (which actually run at 33 Kbps) are woefully inadequate in transferring data at rates required for the graphic intensive presentations that are typically provided on the Internet, or video services such as video on demand, video conferencing, video telephones, and medical imaging, which are technologies that are posed to explode into huge markets once the telecommunications industry is capable of providing the bandwidth needed to deploy these technologies. ISDN services, which are only several times faster than the 56 k analog modems, are now also insufficient for everyone except the most casual Internet user. It is clear that users are requiring sufficiently more bandwidth (faster data transfer rates) than that which can be provided by analog modems or ISDN.

Since DSL lines are not widely available at the current time, corporate demand for more data bandwidth typically comes in the form of additional T-1 lines, while small business and home users can only afford additional analog lines (plain old telephone service or POTS), or in some cases, ISDN service. The demand for additional lines has strained the capacity of the local Telecos (Local Exchange Carriers or LECs) which have attempted to make more effective use of their existing cable facilities by using frequency multiplexed systems in which multiple users are connected to a single twisted pair. However, even these solutions have become strained.

The cost of burying additional cables to run additional POTS lines so that small users can attach to the Internet using analog modems on low cost local calls has become very worrisome to Telecos. The relatively small amount paid for an additional line will not allow the Telecos to recoup their investment for many years and the extended local telephone calls that have resulted from extensive use of the Internet strains the switching capacity of the Telecos, as indicated above. Also, deregulation has allowed for competition in the local loop by Competitive Local Exchange Carriers (CLECs), which also may limit the LECs' recoupment of their expense in laying additional lines. LECs have attempted to generate some additional profit by acting as an Internet Service Provider (ISP) and charging customers for data services to access the Internet. The fact still remains that a customer can tie up a channel on a LECs' facility for 24 hours a day, if he or she desires, and only pay the basic monthly fee for the basic POTS service.

Digital Subscriber Line (DSL) technology may provide a solution to many of the problems, as outlined above, of the LECs and may provide more incentive for long distance companies to compete as CLECs. DSL technology can provide both a high speed data service and POTS service on a single line. By deploying DSL to its customers, LECs will be able to charge customers for POTS service, high speed data service and ISP services over a single twisted pair. Since DSL services are capable of providing such high bandwidth, they have a great deal of value in being able to provide graphic intensive Internet presentations, video on demand, video conferencing, etc. as indicated above. As such, DSL services can be priced accordingly. DSL technology uses a Digital Subscriber Line Access Multiplexer (DSLAM) in the central office which separates the voice information from the computer data. The DSL signal comprises an analog voice signal with digital/analog tone data modulated at a much higher frequency on top of the voice data. Frequency filters and de-multiplexers are utilized in the DSLAM to separate these two different frequency modulated channels. The DSLAM routes the voice information to the standard voice switch at the central office and routes the computer information to computer network equipment, such as a router, bridge, switch, etc. In this manner, digital data does not tie up the voice switch and new data services can be provided to the subscriber which are routed around the existing voice switches at the central office. This unloads the voice switches of the LECs from the task of carrying data traffic and eliminates the huge expense of adding switch capacity for analog modem users.

DSL products are available in several different varieties. ADSL, SDSL, and MDSL provide data rates of multiple megabytes per second. SDSL, HDSL, and IDSL provide data rates similar to T-1 rates of 1.544 megabytes per second. All of these different varieties of digital subscriber lines are referred to as xDSLs. The slower DSL technologies have typically used 2B1Q encoding which is capable with T-1 transmissions and does not provide interference when transmitted in the same wire bundle. A typical xDSL implementation utilizes a digital modem that is plugged into the DSL line. The digital modem has a connection for a standard analog phone and an Ethernet port for connection to computer equipment. In this fashion, a single voice line and a computer line are provided to the subscriber over a single twisted pair using typical DSL services.

Although current DSL technology is a solution to many of the problems faced by LECs and provides incentive for others to enter the local telephone market, current DSL technology is limited to broadband digital channel(s) and a single analog POTS channel on a single twisted pair. It would therefore be advantageous to provide a broadband digital channel and multiple analog POTS lines over a single twisted pair in order to provide high bandwidth data services as well as multiple voice services on a single twisted pair. In addition, it would be advantageous to be able to allocate and de-allocate these services in a fashion that is convenient, cost effective, and maximizes the use of the DSL services.

It is against this background, and the limitations and problems associated therewith, that the present invention has been developed.

SUMMARY OF THE INVENTION

The present invention overcomes the disadvantages and limitations of the prior art by providing high speed digital DSL services together with multiple voice channels (POTS services) over a single twisted pair. The present invention can dynamically allocate available bandwidth to data services while giving multiple voice channels priority in the dynamic allocation process. In one implementation, the present invention uses time domain multiplexing to provide six 64 Kbps channels on the DSL line. Other implementations may support up to thirty-two 64 Kbps channels. These channels can be dynamically allocated (on the fly) between POTS services and data services. As implemented, the POTS circuits always take precedence over the data circuits. If no POTS circuits are active, then all channels are allocated to the data services, providing a maximum throughput of 384 Kbps to 2.048 Mbps. When an incoming call is received, the present invention will de-allocate a 64 Kbps channel from the data bandwidth and reserve that channel as a clear channel for voice data. This channel will remain dedicated to the voice call as long as the call is in progress. When the call has been completed, the 64 Kbps channel is automatically reallocated to data services. If all channels are allocated to POTS services, there could be no data services available until a POTS circuit is released. The present invention also uses automatic de-allocation of data channels after packet transmission. In other words, data packets are transmitted over channels that are available to data services. Once a packet is transmitted, that channel is automatically de-allocated and made available for use as either a POTS line or transmission of additional data packets. Data packets can be distributed over all of the available channels for both transmission and reception. Automatic de-allocation, as soon as the transmission is completed, allows for maximum use of the available data services.

The present invention may therefore comprise a method of providing a predetermined number of multiple channels on a single digital subscriber line for the transmission of voice signals and data signals and maximizing the number of channels available for transmission of the data signals to maximize the data transmission rate of the data signals while making all channels available for transmission of the voice signals comprising the steps of: time division multiplexing the digital subscriber line to provide the predetermined number of multiple channels on the digital subscriber line; allocating clear channels from the predetermined number of multiple channels for the voice signals that are initiated over the digital subscriber line; de-allocating the clear channels upon termination of each of the voice signals; transmitting the data signals over open channels, that are not allocated as clear channels for transmission of the voice signals, such that the data signals are distributed across the open channels to provide a high data transmission rate.

The present invention may further comprise a method of transmitting multiple voice signals between a central office switch located at a central office and multiple POTS lines connected to a remote terminal, and transmitting data signals between a central office data port located at the central office and a subscriber data port connected to the remote terminal comprising the steps of: providing a digital subscriber line between the central office and the remote terminal, the digital subscriber line having multiple time domain multiplexed channels for carrying both the multiple voiced signals and the data signals; directing the data signals received from the digital subscriber line at the central office to a central office data port; directing the multiple voice signals received from the digital subscriber line at the central office to the central office switch for distribution to the public switched telephone network; directing the data signals received by the remote terminal from the digital subscriber line to the subscriber data port; directing the multiple voice signals received by the remote terminal from the digital subscriber line to the multiple POTS lines; allocating the multiple time domain multiplexed channels so that all of the multiple time domain multiplexed channels are available for the transmission of the multiple voice signals and all remaining open channels are available for transmission of the data signals.

The present invention may further comprise a system for transmitting multiple voice signals and data signals over a multiple channel digital subscriber line comprising: a remote terminal connected to the digital subscriber line that directs data signals between the multiple channel digital subscriber line and a data port and directs voice signals between the multiple channel digital subscriber line and multiple POTS lines; a central office terminal controller connected to the multiple channel digital subscriber line that directs data signals between the multiple channel digital subscriber line and a central office data port, and directs voice signals between the multiple channel digital subscriber line and a central office switch.

The advantages of the present invention are that multiple POTS lines can be provided as well as data services over a single twisted pair using high speed DSL services. This is accomplished by dynamic allocation of multiple TDM channels with POTS services taking precedent over data services. The manner in which this invention is implemented allows POTS circuits up to 23,000 feet from the central office or from a fiber node. Additionally, the number of channels that are made available to a subscriber can be simply programmed from the central office without the need for additional hardware. The present invention can be configured and controlled using the operations and support system in the central office of the LEC or via standard SNMP software using TCP/IP protocol, or with a standard browser program such as Netscape or Microsoft Explorer. Ease of use and familiarity of such software systems by central office employees facilitates the implementation of the present invention. Another advantage of the present invention is that it uses standard 2B1Q line coding which maintains a compatibility with existing services, such as T-1, in cable bundles. Additionally, the present invention is easy to install as a standard network interface unit. The provisioning of lines, or channels, in accordance with the present invention is a process that is known and understood by service personnel. Further, field personnel do not have to be concerned with reconfiguring the system since it is fully configurable from the central office. Also, the grade of service provided to the customer can be changed at any time to the network management system at the central office without the need of special services. Additionally, the present invention can be implemented with line cards that can be easily replaced to upgrade the system as faster data services become available.

DETAILED DESCRIPTION OF THE PREFERRED EMBODIMENT

Figure 1:
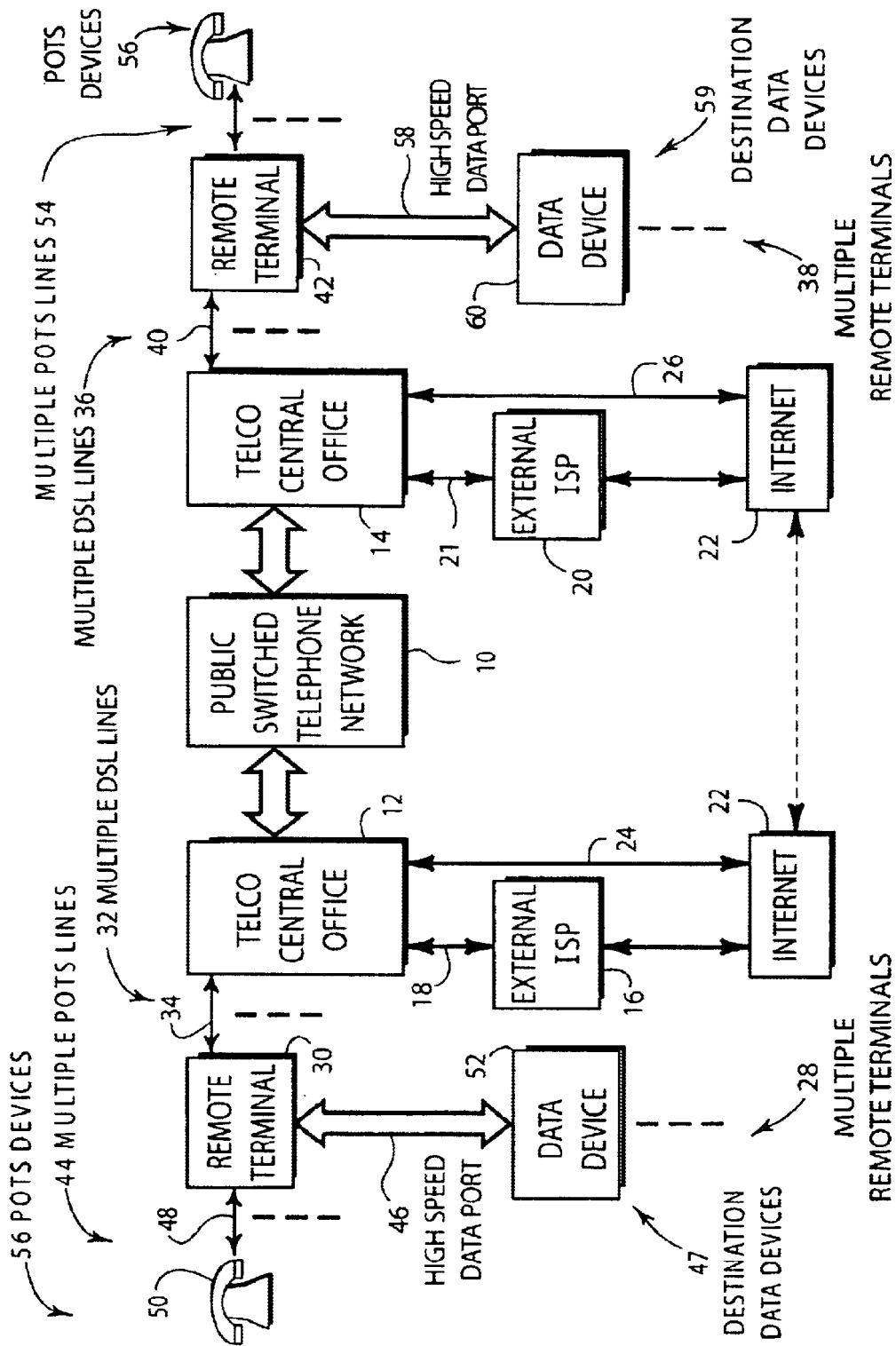
FIG. 1 is a schematic block diagram illustrating a telephone network system in which the present invention is implemented.

FIG. 1 is a schematic block diagram of the overall system in which the present invention is implemented. As shown in FIG. 1, the public switch telephone network 10 is connected to various Teleco central offices such as Teleco central offices 12 and 14. This is the standard telecommunications structure utilized worldwide to provide standard telecommunications. Each Teleco central office normally provides high speed connections to external Internet Service Providers (ISP). For example, Teleco central office 12 may provide a high speed connection 18 to external ISP 16. Similarly, Teleco central office 14 may provide a high speed connection 21 to external ISP 20. Each of these external ISPs has a high speed interconnection to Internet 22. Alternatively, the Teleco central offices can offer ISP services and provide a direct connection to the Internet. For example, Teleco central office 12 may be connected to Internet 22 via a high speed connection 24. Similarly, Teleco central office 14 may be connected to Internet 22 through a high speed connection 26.

As also shown in FIG. 1, the present invention employs multiple digital subscriber lines (DSLs) that connect multiple remote terminals to the Telco central office. For example, in accordance with the present invention, a plurality of remote terminals 28, such as remote terminal 30, are connected to the Telco central office 12 by way of the multiple DSL lines 32 of the present invention, such as DSL line 34. In a similar fashion, multiple DSL lines 36 provide connections to multiple remote terminals 38. For example, DSL line 40 provides a connection between Telco central office 14 and remote terminal 42. Each of the multiple DSL lines 32 of the present invention provide multiple time domain multiplexed channels that are used by the remote terminals 28 to provide multiple standard telephone interface (plain old telephone service POTS) lines 44 and a high speed data port 46. The high speed data ports, such as high speed data port 46 of remote terminal 30, are connected to destination data devices 47, such as data device 52. For example, remote terminal 30 can be connected over a POTS line 48 to a telephone 50, or a modem device, such as a fax machine or a computer modem. High speed data port 46 may comprise a 10 Base-T Ethernet port that is connected to a data device 52, such as a computer, or other processing device such as a router, bridge, hub, switch or similar device that is connected to a network. Similarly, multiple POTS lines 54 connect remote terminal 42 to multiple POTS devices such as phone, faxes or other modem devices, such as computers having modems. The high speed data ports of multiple remote terminals 38, such as high speed data port 58, are connected to destination data devices 59, such as data device 60.

As indicated above, the DSL lines of the present invention as shown in FIG. 1 provide multiple time division multiplexed (TDM) channels. The POTS devices are given priority in the allocation of POTS lines while the data devices such as computer 52 or computer 60 transmit data over the open DSL channels that are not being used by the POTS devices. Hence, the POTS devices have priority in accessing all of the multiple time division multiplexed channels, while the remaining available (or open) channels are used to transmit data to and from the data devices. By distributing data packets across the open or available channels of the DSL line, increased data transfer rates can be obtained. However, when more POTS devices occupy more of the multiple time division multiplexed channels on the DSL line, the number of open (or available) channels decreases, and hence the data transfer rates decrease. Of course, as clear channels are released by the POTS devices, more channels become available as open channels and the data transfer rate increases. In this way, multiple POTS lines can be available over a single twisted pair DSL line in accordance with the present invention, while providing the ability to also transmit data over the same DSL line having a data transfer rate that varies in accordance with the number of POTS devices that are being utilized. The high speed data ports on the remote terminals can comprise any type of desired data port. Currently, any type of Ethernet port can be readily used by most data devices, such as data devices 52 and 60.

As also shown in FIG. 1, the multiple remote terminals 28 and 38 comprise boxes that are placed at the subscriber's home or business. In accordance with the present invention, the multiple POTS lines 44, 54 provide clear channels to each POTS device 50, 56 via DSL lines 34, 40, respectively. For example, the present invention may be implemented to provide 18 clear channels running at 64 kilobits per second on each DSL line. As mentioned above, these channels comprise time slots or TDM channels. It is envisioned that the local exchange carrier (LEC) or competitive local exchange carrier (CLEC) may allow the subscriber to subscribe to a predetermined number of channels. For example, one subscriber may only have a need for 6 channels while another subscriber may desire 18 channels. As pointed out above, the greater the number of channels, the higher the data transfer rate that can be provided. The Telecos can also generate test signals to determine how many channels can be supported by the physical equipment of each of the subscribers. For example, the type of connectors used on a particular twisted pair and other factors may only allow a limited bandwidth signal to be transmitted over the twisted pair. The LEC or CLEC can send test signals to a remote terminal at the subscriber site to determine the maximum bandwidth of the physical equipment of the subscriber so that the subscriber can then subscribe to any number of channels up to the maximum bandwidth that the physical equipment will support. The central office equipment, as explained in more detail later, can then program the remote terminal so that the number of channels that have been subscribed to are provided to the subscriber.

Figure 2:
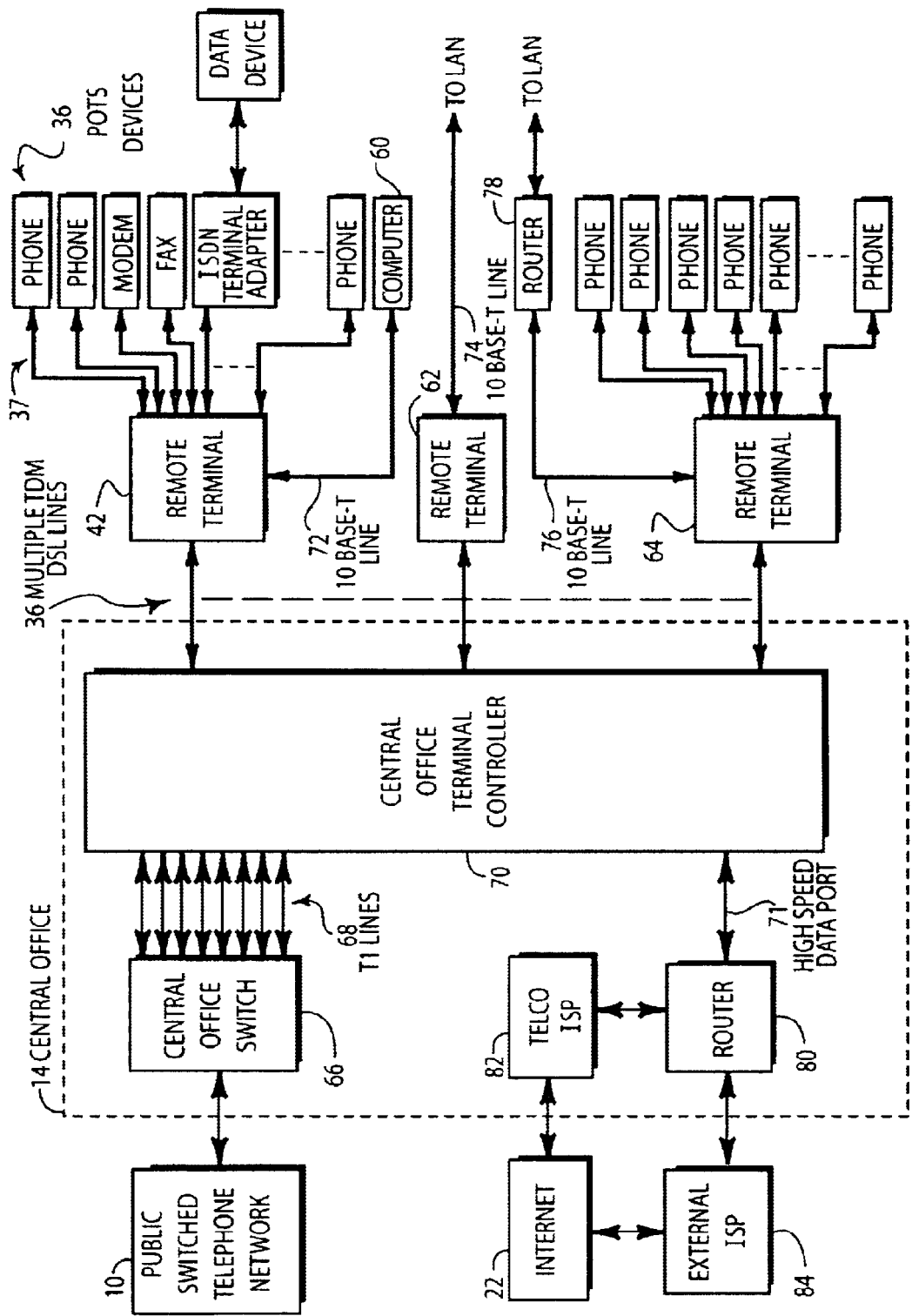
FIG. 2 is a schematic block diagram of one implementation of the present invention.

FIG. 2 is a block diagram of the manner in which a central office 14 is implemented with various remote terminals, such as remote terminal 42, 62, and 64. As described earlier, the public switch telephone network 10 is connected to the central office 14. Signals from the public switch telephone network 10 are coupled to the central office switch 66 of central office 14. Central office switch 66 is connected by eight T-1 lines 68 to the central office terminal controller 70. The central office terminal controller controls the flow of data between the multiple TDM DSL lines 36, the eight T-1 lines 68, and the high speed data port 71, which can comprise a 100 base-T Ethernet port. The central office switch 66 routes the calls that are destined to one of the remote terminal devices that is connected to the central office terminal controller 70 over one of the eight T-1 lines 68. The central office switch 66 is the large switching equipment that is used in the central office 14 for routing calls. The central office switch uses a routing table to route a call from the public switch telephone network 10 to the correct T-1 lines 68. Central office terminal controller 70 may have the ability to route a call on any channel of any one of the T-1 lines 68 to any of the remote terminals that are connected to the central office terminal controller 70. In a similar fashion, a signal received by the central office switch 66 from the central office terminal controller 70 over one of the T-1 lines 62 is routed in the proper manner to the public switch telephone network 10.

It is also shown in FIG. 2, multiple TDM DSL lines 36 are connected to multiple remote terminals such as remote terminals 42, 62, and 64. Remote terminal 42 is connected to POTS devices 56 over a plurality of POTS lines 57. Remote terminal 42 is also connected to a computer 60 via a high speed data port 72, such as a 10 base-T line. FIG. 2 illustrates that POTS devices 56 can comprise phones, modems, fax machines, or an ISDN terminal adapter which is connected to a data device. Each of these devices transmit signals on a standard telephone interface, such as a POTS line. The 10 base-T Ethernet line 72 may provide data packets in standard Ethernet protocol to the computer 60 which contains an Ethernet card. Remote terminal 62 shows another implementation in which a single 10 base-T line 74 is connected to the remote terminal 62. The 10 base-T line 74 is, in turn, coupled to a local area network which is, in turn, connected to a number of computer nodes or other similar devices.

FIG. 2 also illustrates a remote terminal 64 that is connected to a number of POTS devices such as phones, and a 10 base-T port 76 which is coupled to a router 78. Router 78, in turn, is connected to a local area network. The router 78 can comprise a router, bridge, switch, or other desired device that is connected to the LAN. Data communications can be routed between the high speed data port 71 and the various data ports of the remote terminal, such as data port 72 of remote terminal 42, data port 74 of remote terminal 62, and data port 76 of remote terminal 64. The high speed data port 71 is connected to a router 80 which, again, can comprise a router, a bridge, a switch or other similar device for handling the 100 megabit Ethernet data. The router may be coupled to either a Teleco Internet Service Provider 82 or an external Internet Service Provider 84, or both. Each of these ISPs has a high speed connection to the Internet 22. Communications destined to a user from Internet 22 may be transmitted through router 80 to the central office terminal controller 70, which in turn routes the data to the appropriate remote terminal. The remote terminal then routes the data to its high speed data port, such as data ports 72, 74 and 76.

Figure 3:
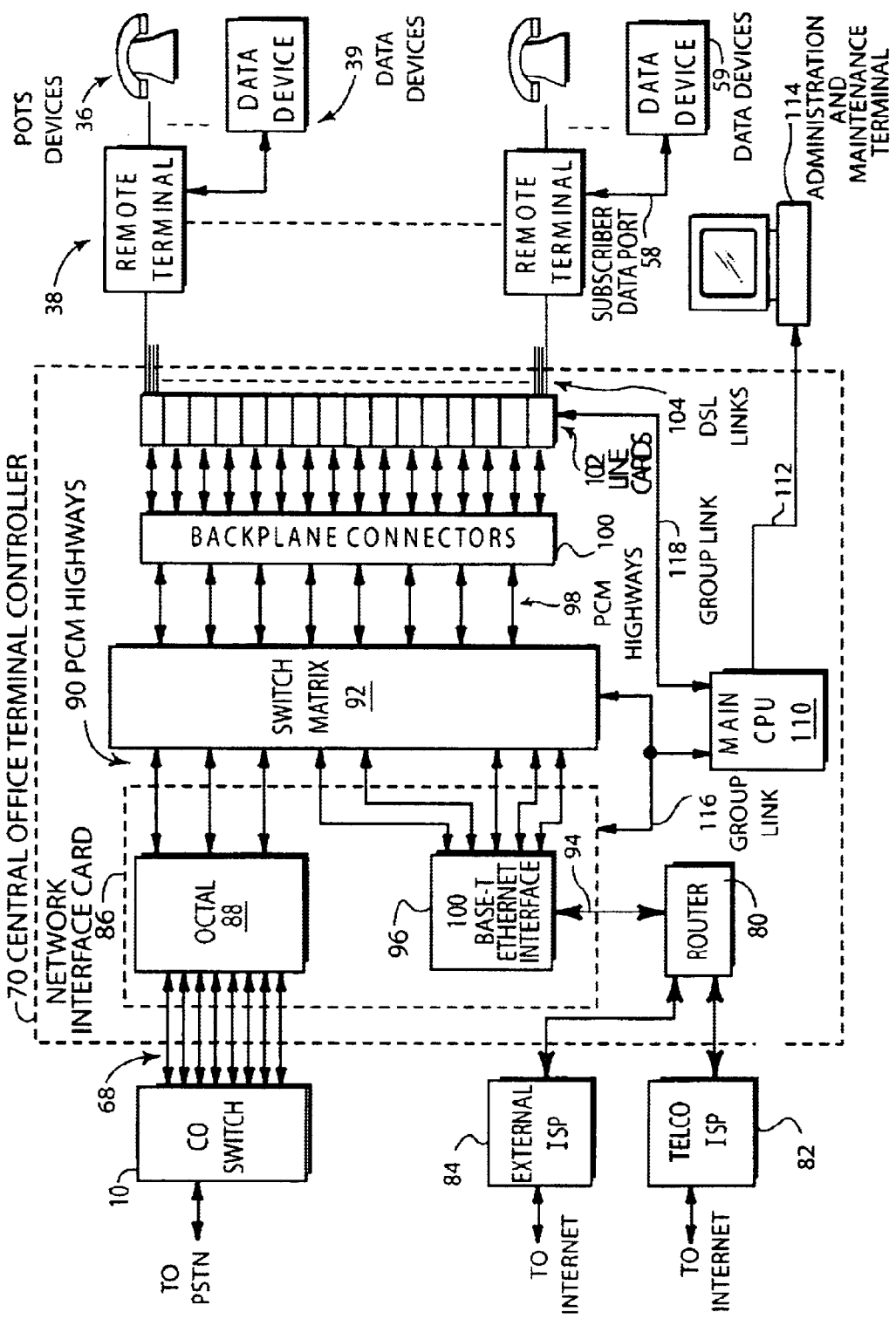
FIG. 3 is a more detailed schematic block diagram illustrating an implementation of the present invention.

FIG. 3 is a more detailed block diagram of the system illustrated in FIG. 2. Again, the central office switch 10 is connected to the public switch telephone network and to the central office terminal controller 70 via T-1 lines 68. Although the communication channels 68 are typically T-1 lines, they may comprise DS-1, T-3, DS-3, ATM or optical links such as Sonnet or OC-1. Communication links 68 are coupled to a network interface card 86 containing an octal device 88. Octal device 88 functions as an interface between the pulse code modulation (PCM) highways 90 and the communication lines 68. The network interface card 86 also has a 100 megabit Ethernet port 94. A router 80 is connected to the 100 megabit Ethernet port 94, which is in turn connected to a Teleco ISP 82 and an external ISP 84, as set forth in FIG. 2. The network interface card 86 therefore receives 100 megabit data signals at port 94, as well as voice signals over the eight high speed communication lines 68, and communicates this information to switch matrix 92, via PCM highways 90. The 100 base-T Ethernet interface 96 functions as an interface between the PCM highways 90 and the Ethernet data at port 94. The PCM highways 90 transmit pulse code modulated serial bit streams to and from the switch matrix 92. Switch matrix 92 has an additional eight bi-directional PCM highways 98 that connect the switch matrix 92 to the backplane connectors 100. The switch matrix 92 is responsible for cross-connecting any time slot on any of the PCM highways 90 to any of the time slots on PCM highways 98. Switch matrix 92 therefore comprises a complete cross matrix design.

As also shown in FIG. 3, backplane connectors 100 function to distribute the physical connections of the PCM highway connections 98 to the line cards 102. Any desired method of distributing connections via the backplane can be utilized. In accordance with the present invention, the eight PCM highways 98 are connected to the 16 line cards 102 in a symmetrical manner. For example, the first PCM highway may be connected to line cards number 1, 4, 8 and 12. Similarly, the second PCM highway may be connected to line card number 2, number 5, number 9, and number 13. In this manner, an even physical distribution can be accomplished between the PCM highways 98 and line cards 102.

FIG. 3 also illustrates four DSL lines 104 that are connected to each one of the line cards 102. In this implementation of the invention, 64 DSL lines can be provided from one shelf of line cards 102. In accordance with one implementation of the present invention, each of the DSL lines can provide 18 channels. Similarly, PCM highways 90 and 98 can each carry from 64 to 128 channels. Further, if the high speed communication lines 68 are implemented in T-1 , each T-1 can have 24 channels. The 100 megabit Ethernet port 94 is capable of handling all of the data from all of the data devices 59 on all 64 DSL lines 104. The high speed communication link 68 between the central office switch 10 and the network interface card 86 can be upgraded to DS-3, or other links, so that all of the POTS devices 56 can be utilized simultaneously if needed. However, from a statistical standpoint, such broad bandwidth at the communication link 68 is not required because standard POTS devices will not normally be used to connect to the Internet with this implementation. Rather, data devices 59 will be connected to a subscriber data port 58 to transmit data to interface 96. Typical use of the POTS lines will then revert to standard phone calls which normally have a very short duration.

It is also shown in FIG. 3, the network interface card 86, the switch matrix 92 and line cards 102 are all connected to and under the control of a main CPU 110. This main CPU may be a Pentium level type of processor. The main CPU 110 has a high speed Ethernet port 112 that is connected to an administrative and maintenance terminal 114. Central office personnel can therefore control the operation of the central office terminal controller 70 via the main CPU 110 by way of the administrative and maintenance terminal 114. The administrative and maintenance terminal 714 controls the provisioning of services to customers and their connection through the communication port 68, and various other controls are all provided by the administrative and maintenance terminal 114. For example, administrative and maintenance terminal 114 is capable of programming the number of channels that can be provided over any one of the DSL lines to a remote terminal and can also control the testing of the DSL lines to determine the bandwidth of the physical connections to any remote terminal.

In addition, FIG. 3 illustrates the manner in which the main CPU 110 controls the operation of the network interface card 86, switch matrix 92 and line cards 102. Grouplink connection 116 is a high speed serial bus that runs between the main CPU, and the network interface card 86 and switch matrix 92. Similarly, group line connection 118 is a high speed serial bus that links line cards 102 and main CPU 110. Each grouplink has a multi-drop type protocol that is capable of configuring and controlling the network interface card 86 and the switch matrix 92. By separating the two grouplinks, the bandwidth can be separated and the system has better throughput.

The system of FIG. 3 operates in the following manner. If a call is originated from an external location such as New York, it is received in the central office at the central office switch 10. The central office switch 10 transmits the signal via one of the T-1 links 68 to the network interface card 86. The network interface card 86 provides an indication via grouplink 116 to the main CPU 110 that the central office switch 10 is setting up a call on one of the particular T-1 lines 68. CPU 110 then configures the system of FIG. 3 to direct the call to the proper remote terminal. First, the dialed number is identified and the main CPU 110 determines the location of the dialed number from a look-up table associated with CPU 110. The particular line card 102 is identified, as well as the particular DSL line 104, and a particular channel is identified on the DSL line 104. The main CPU 110 then sends a command via grouplink 116 to switch matrix 92 and to network interface card 86 to transmit that signal through a particular path on PCM highways 90 and PCM highways 98. Any desired path or channel on PCM highways 90 can be used to communicate the signal to switch matrix 92 since switch matrix 92 comprises a complete matrix. If switch matrix 92 is designed to not provide a full matrix, specific paths may have to be identified within the PCM highway 90. Switch matrix 92 must, however, identify a specific PCM highway 98 so that the signal is transmitted to the correct backplane connector 100 which connects to the proper line card 102. Again, the main CPU 110 uses the correct information that is provided by a look-up table to control the switch matrix 92 to transmit the signal to one of several correct PCM highways 98 so that the signal is directed to the proper line card 102.

Main CPU 110 of FIG. 3 also sends commands to the particular line card indicating that it is going to receive a call that is destined for a particular DSL line in a particular phone. For example, the main CPU 110 may send a command to line card number twelve that a call is going to be received for its DSL line number three for phone number six on that particular DSL line. In that case, line card number twelve would send a command over the signaling channels of the DSL link to the remote terminal that is connected to DSL line number three. The remote terminal would then perform the Borscht functions and cause phone number six to ring. When a person picks up the phone, a command would be sent over the signaling channels of DSL line number three from the remote terminal back to line card twelve indicating that phone number six is off the hook. Line card number twelve would then send a command over grouplink 118 to the main CPU 110 indicating that the phone is off the hook. The main CPU 110 would then proceed to finish the connections through the network interface card 86, PCM highway 90, switch matrix 92, PCM highway 98, and line cards 102 to finish the connection. In this way, the call that originated on a particular T-1 line 68 gets routed through the network interface card on a particular PCM highway 90 on a particular channel, that is selected by CPU 110, to the switch matrix 92, which then routes the signal on a particular PCM highway 98, in another time slot channel, to the correct line card 102 (e.g., line card twelve). The line card 102 determines the channel on which it is receiving a signal from the backplane connectors and cross-connects that channel to a particular DSL channel on the DSL line. The remote terminal receives the signal on the predetermined channel of the DSL link and utilizes a switch matrix in the remote terminal to place the signal on a predetermined channel for the destination POTS device.

As described above with regard to FIG. 3, these channels that are set up from the central office switch 10 through the remote terminals 38, are virtual circuits that provide a clear channel between the PSTN and the POTS devices. In other words, once the channel is allocated for transmission of voice signals, the channel is dedicated 100 percent of the time to that voice signal until a hang-up occurs on either end. This virtual circuit most likely will not physically exist in the same form, having the same route, each time a phone call is received or initiated by POTS device 56, but remains open as a clear channel for the entire duration of the call. In other words, a call may be routed in different ways each time a connection is made, but once the call is set up and the route is configured, that route remains for the duration of the call. Of course, the remote terminals 38 will detect a hang-up of POTS device 56 and will provide a command over the command lines of the DSL lines 104 to line cards 102 indicating that a hang-up has occurred. Line card 102 provides a command to main CPU 110 over grouplink 118 that a hang up has occurred and the CPU 110 then generates commands on grouplink 118 and grouplink 116 to terminate the connection. Similarly, if the network interface card 86 receives a command from the central office switch 10 that the call has been terminated, the main CPU 110 receives a command over grouplink 116 from network interface card 86 that the call has been terminated. Main CPU 110 then provides commands over grouplink 116 and grouplink 118 to terminate the call.

With regard to the transmission of data over the system illustrated in FIG. 3, it is important to understand that data, by its very nature, is bursty. For example, a number of data packets may be transmitted through the system illustrated in FIG. 3 in a very fast manner and there will be a period of time before a response is received. A response may be delayed by network delays and networking equipment and response delays from the server from which information is requested. All of these delays add together. Hence, the duty cycle for the transmission of data is very low. So, for example, if a subscriber subscribed to 18 channels and 10 channels were open, available channels, and all of these 10 channels were allocated for data transmission as clear channels, there would be a very low duty cycle or usage of the 10 clear channels. In addition, there would be no way of knowing when the data transmissions had been completed, since there is no on-hook or off-hook commands associated with the transmission of data. For this reason, the main CPU 10 generates commands on grouplink 116 and 118 when data is being transmitted through the system of FIG. 3 to allocate a channel for the transmission of the data, but only for the duration of time that it takes to pass a packet of data through the system. In other words, an Ethernet packet, or an Internet packet (IP packet), is distributed over a number of different channels and transmitted through the system in response to channels allocated by the CPU 110 via grouplink commands from grouplink 116 and grouplink 118. Each of these channels is then immediately de-allocated as soon as the data packets are transmitted through the system. These channels then become available as open channels for allocation as clear channels for voice transmissions or to transmit data. For example, if a subscriber has subscribed to six channels and no POTS devices 56 are being used, all six channels would be available for transmitting and receiving data by data devices 59. The various data packets from data devices 59 would be channelized and distributed over all six channels and transmitted via DSL lines 104 to the central office terminal controller 70. This channelized data would then be transmitted through the line cards 102, the backplane connectors 100, PCM highways 98, switch matrix 92 and PCM highways 90 to the Ethernet interface 96. The Ethernet interface 96 then configures the data as an Ethernet data packet to be transmitted to router 80.

The parallel transmission of the data packets, as described above with regard to the operation of the system of FIG. 3, provides a very high data transfer rate through the system and allows the various channels to be de-allocated in a very rapid fashion to make those channels available as open channels for voice signals or further data signals. As pointed out above, at least four PCM highways 98 are capable of carrying data to and from each line card 102. Hence, the data can be distributed across four PCM highways 98 to obtain the maximum utilization of bandwidth. Since each PCM highway 98 has 64 times slots, a total of 256 different time slots on PCM highway 98 are available for transmitting and receiving data to a particular line card 102. In this manner, the backplane connectors help distribute the load to different PCM highways.

Figure 4:
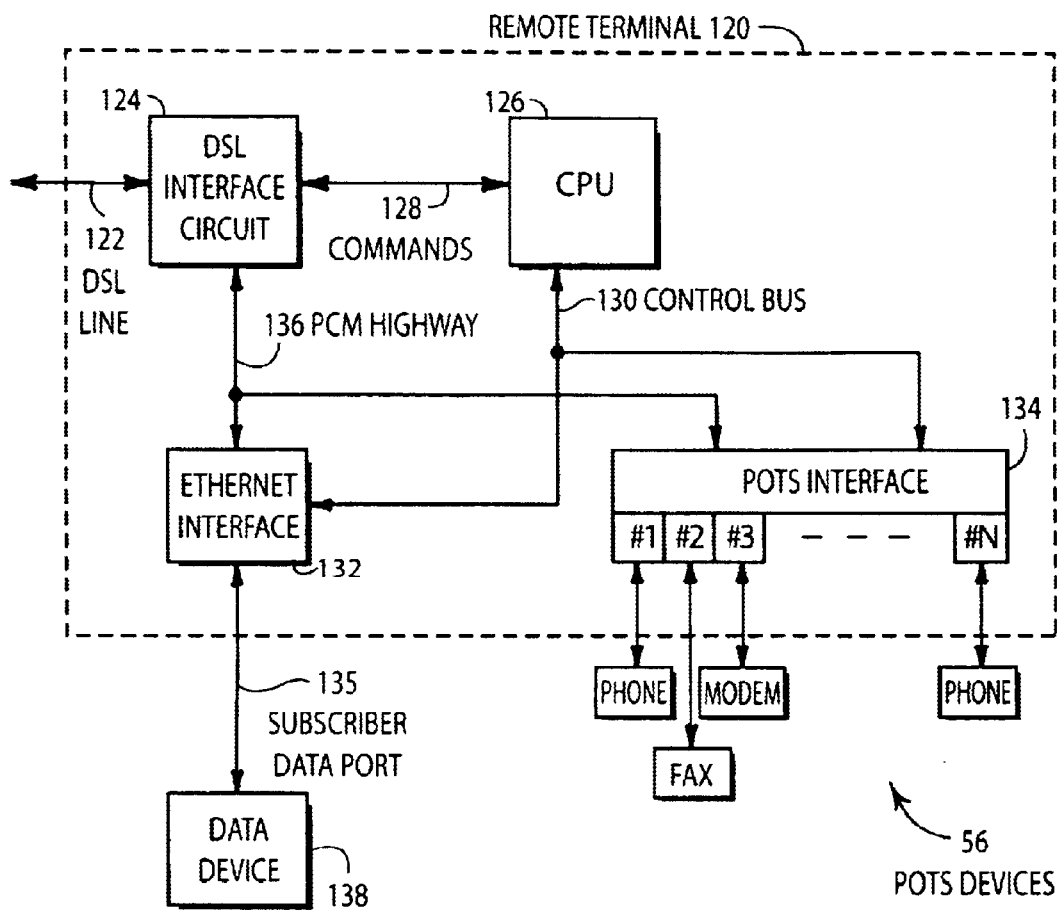
FIG. 4 is a schematic block diagram of a remote terminal.

FIG. 4 is a schematic block diagram of a remote terminal 120 of the present invention. As shown in FIG. 4, a DSL line 122 is coupled to a DSL interface circuit 124 in remote terminal 120. DSL interface circuit 124 sends and receives commands to CPU 126 via command line 128. These commands may be received from a line card via signaling channels of DSL line 122, or may be generated by the CPU 126. CPU 126 is also connected to a control bus 130 that sends and receives commands between CPU 126 and Ethernet interface 132 and POTS interface 134. DSL interface circuit 124 separates the voice and data signals from the command signals and transmits and receives voice and data signals over the PCM highway 136. PCM highway 136 is connected to the Ethernet interface 132 and the POTS interface 134. The Ethernet interface 132, which may comprise a 10 base-T Ethernet interface is connected to a subscriber data port 135. The subscriber data port 135 is connected to a data device 138, such as one of the data devices 59 (FIG. 3). This data device can be a computer, router, bridge, LAN hub, or other such device, as described above. POTS interface 134 is connected to a number of different POTS devices 56 through standard telephone connections that are labeled numbers #1-#N on the POTS interface 134.

The remote terminal system 120 of FIG. 4 operates in the following manner. Commands are received over the command or signaling channels of DSL line 122 from the line cards 104 (FIG. 3) of the central office terminal controller 70 (FIG. 3) by the DSL interface circuit 124. These commands are generated by the main CPU 110 (FIG. 3) when the CPU 110 needs to command the remote terminal to perform some operation. CPU 110 generates a command that is received by line card 102, and line card 102 places these commands in the proper format on the signaling channels of the DSL lines 104 (FIG. 3). Such a command may be, for example, to ring a particular phone. For example, the main CPU 110 may transmit a command that would be sent over grouplink 118 down the backplane to a particular line card 102 that would recognize the command as being destined for that particular line card. Line card 102 deciphers the command and reformats the command to a new command format so that it can be sent over the signaling channel of the DSL link 104 to a particular remote terminal 38. The DSL interface circuit 124 receives the command on the signaling channels and transmits that command to CPU 126. CPU 126 then reads that command and generates a command on control bus 130 to perform that function, i.e., ringing a particular phone connected to POTS interface 134. DSL interface circuit 124 also receives voice and data signals on DSL line 122 and rederives the PCM digital data, which is transmitted to PCM highway 136.

In accordance with the present invention as shown in FIG. 4, 2B1Q encoding may be used on the DSL line 122. The 2B1Q uses channelized signaling in the same manner as a PCM bus. In other words, the commands and digital data are framed and channelized in a sequence of serial bits. The first bits indicate the beginning of the frame. A certain number of bits can be counted to determine each channel. The Ethernet interface 132 determines the channels that are associated with the data and places that data in an Ethernet protocol, such as a 10 base-T protocol, so that it is available at subscriber data port 135. The channels on the PCM highway that are designated for the transmission of voice signals, as indicated by control bus 130, are received by POTS interface 134. These voice signals are then transformed by a CODEC in POTS interface 134 into POTS signals that are connected to POTS devices 56. DSL interface circuit 124 includes a switch matrix that operates in response to commands via the command line 128 from CPU 126 to place the voice signals and data signals in the proper channels so that they are received by either the POTS interface 134 or Ethernet interface 132, respectively. CPU 126 also generates commands on line 128 that are transmitted over the signaling channels of DSL line 122 to the main CPU when either POTS devices 56 initiates a call or data device 138 transmits data.

Figure 5:
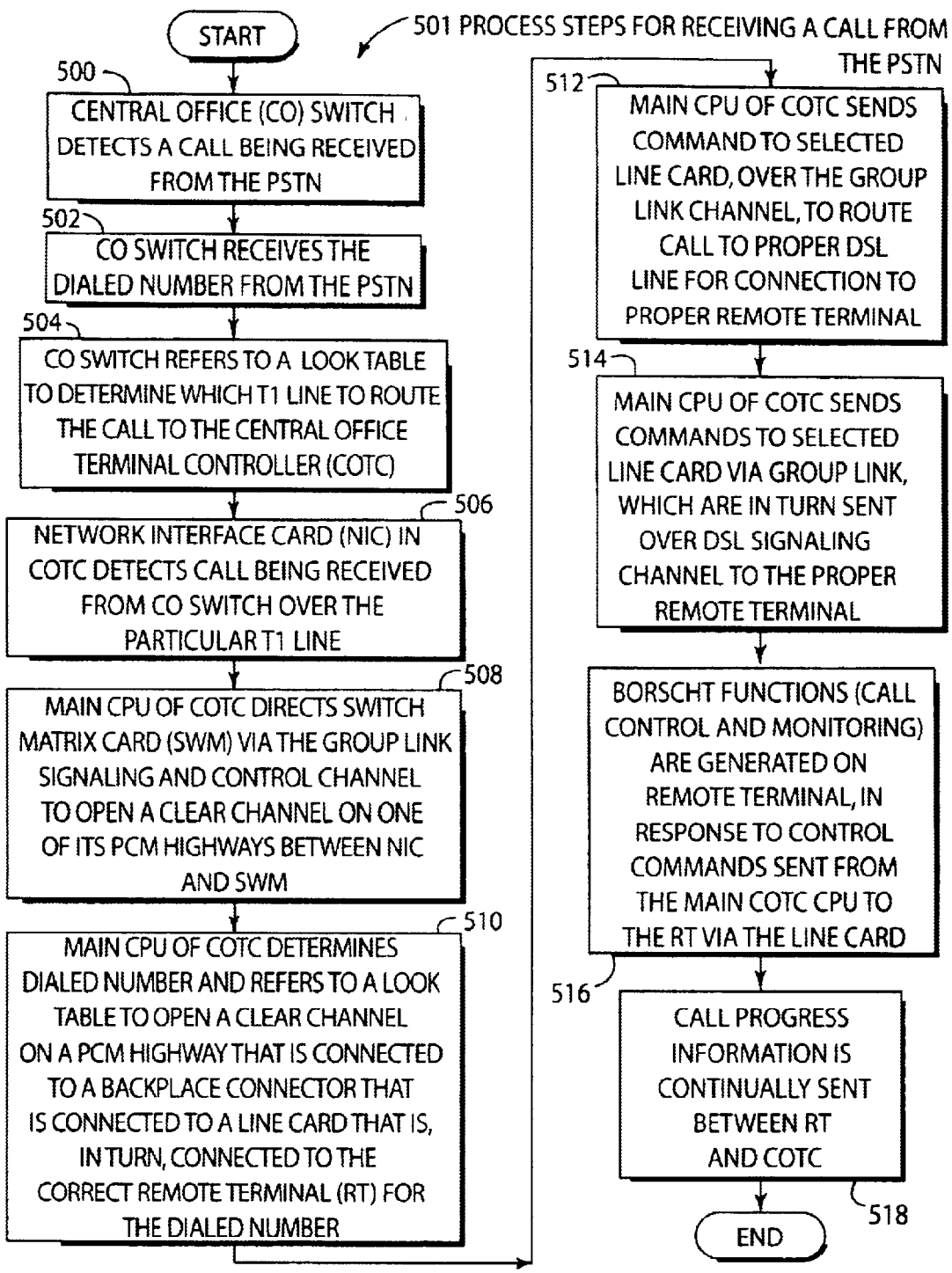
FIG. 5 is a flow chart illustrating steps when a call is received.

FIG. 5 discloses a flow chart illustrating the steps that are performed when a call is received from the public switch telephone network (PSTN) and transmitted to a telephone connected to a POTS line on the right side of FIGS. 3 and 4. At step 500 of FIG. 5, the central office switch 10 (FIG. 3) detects a call being received from the public switch network backbone. At step 502 the central office switch 10 receives the dialed number from the public switch network backbone as part of the header information that is provided on the T-1 lines of the public switch telephone network. At step 504 the central office switch 10 refers to a look-up table to determine which T-1 line 68 (FIG. 3) that it should use to route the call to the central office terminal controller (COTC). The central office switch has a switch matrix that can direct the call to the proper T-1 line 68. The look-up table is configured during the customer configuration of the central office system. This is done in the current manner that the central office switch is programmed for telephone numbers. In this manner, the central office switch knows that the customer's phone number is associated with a specific remote terminal 38 (FIG. 3) and a specific POTS line connected to the remote terminal 38.

At step 506 of FIG. 5, the network interface card 86 in the central office terminal controller 70 detects that a call is being received from the central office switch over a particular T-1 link. The main CPU 110 (FIG. 3), at step 508, then directs the switch matrix card 92 (FIG. 3) via the grouplink signaling channel 116 (FIG. 3) to open a clear channel on one of the PCM highways 90 (FIG. 3) between the network interface card 86 (FIG. 3) and the switch matrix 92 (FIG. 3), as illustrated in FIG. 5. At step 510, the main CPU 110 (FIG. 3) of the central office terminal controller 70 (FIG. 3) also determines the dialed number and refers to a look-up table to open a clear channel on a PCM highway 90 (FIG. 3) to connect the call between the switch matrix 92 (FIG. 3) and the back plane connector 100 that is hard wire connected to a series of line cards 102 (FIG. 3), as illustrated in FIG. 5. One of the line cards to which the back plane connector is connected is, in turn, connected to the proper remote terminal to which the call is destined. The switch matrix is configured to make the proper connections through the grouplink 116 (FIG. 3) since the main CPU 110 knows where the call is destined from a look-up table that is contained within the main CPU 110. The switch matrix is configured to direct the call to the proper line card from the information contained within the look-up table at the main CPU 110 (FIG. 3). The main CPU 110 also contains all of the information relative to line card connections through the line card connector 100 (FIG. 3).

As also shown if FIG. 5, at step 512 the main CPU 110 (FIG. 3) of the central office terminal controller 70 (FIG. 3) sends commands to the appropriate line card 102 (FIG. 3) over the grouplink channel 118 (FIG. 3) to route the call to the proper DSL line 104 (FIG. 3) for connection to the proper remote terminal 38 (FIG. 3). In other words, the main CPU 100 (FIG. 3) refers to a look-up table to determine which remote terminal 38 should receive the call and sends a command to the appropriate line card 102 to cross connect the call to a particular channel on a particular DSL line that is connected to a particular line card 102. In this manner, the channel on the PCM highway 98 which contains the call is cross-connected to a particular DSL line 104 and a particular channel on the DSL line 104.

As also shown in FIG. 5, at step 514 the main CPU 110 sends commands to the selected line card 102 (FIG. 3) via the grouplink 118 (FIG. 3) which, in turn, are sent over a DSL signaling channel to the proper remote terminal. The DSL line card 104 has a separate time domain channel that is used for sending messages between the remote terminals 38 and the central office terminal controller 70 (FIG. 3). Since the main CPU 110 (FIG. 3) cannot talk directly to any remote terminal through a grouplink, the main CPU 110 send messages to the line card 102 which, in turn, sends commands over the signaling channel of the DSL line 104 (FIG. 3). In this manner, the remote terminals 38 and line cards 102 (FIG. 3) communicate over a separate distinct communications channel that is separate from the grouplink communication channel of the central office terminal controller 70 (FIG. 3). The initial message sent over the DSL signaling channel indicates that the remote terminal is going to receive a voice call destined for a particular POTS line on the remote terminal. That command is identified by the DSL interface circuit 124 (FIG. 4) and sent to the CPU 126 via the command line 128 (FIG. 4). CPU 126 cross connects the voice signal in the DSL interface circuit 124 (FIG. 4) to a particular PCM highway 136 (FIG. 4) that carries the actual voice data. The CPU 126 (FIG. 4) sends a message on control bus 130 (FIG. 4) to the POTS interface 134 (FIG. 4) that the voice signal is located on a particular PCM highway channel on PCM highway 136 (FIG. 4) and that it is destined for a particular telephone, modem, fax, etc., (POTS device 56 of FIG. 4). The POTS interface 134 (FIG. 4) then selects the data on the voice signal from the channel of the PCM highway 136 and delivers that signal to the POTS device.

At step 516 of FIG. 5, the BORSCHT functions are generated by the remote terminal 120 (FIG. 4) in response to the control commands that are sent over the signaling channel from the main CPU 110 (FIG. 3) of the central office terminal controller 70 (FIG. 3) to the remote terminal 120 (FIG. 4). The BORSCHT functions include call control and monitoring, such as indicating ring, providing dial tone and other such functions. Similarly, at step 518 call progress information is continually sent between the remote terminal 120 (FIG. 4) and the central office terminal controller 70 (FIG. 3) to indicate the status of the call.

Figure 6:
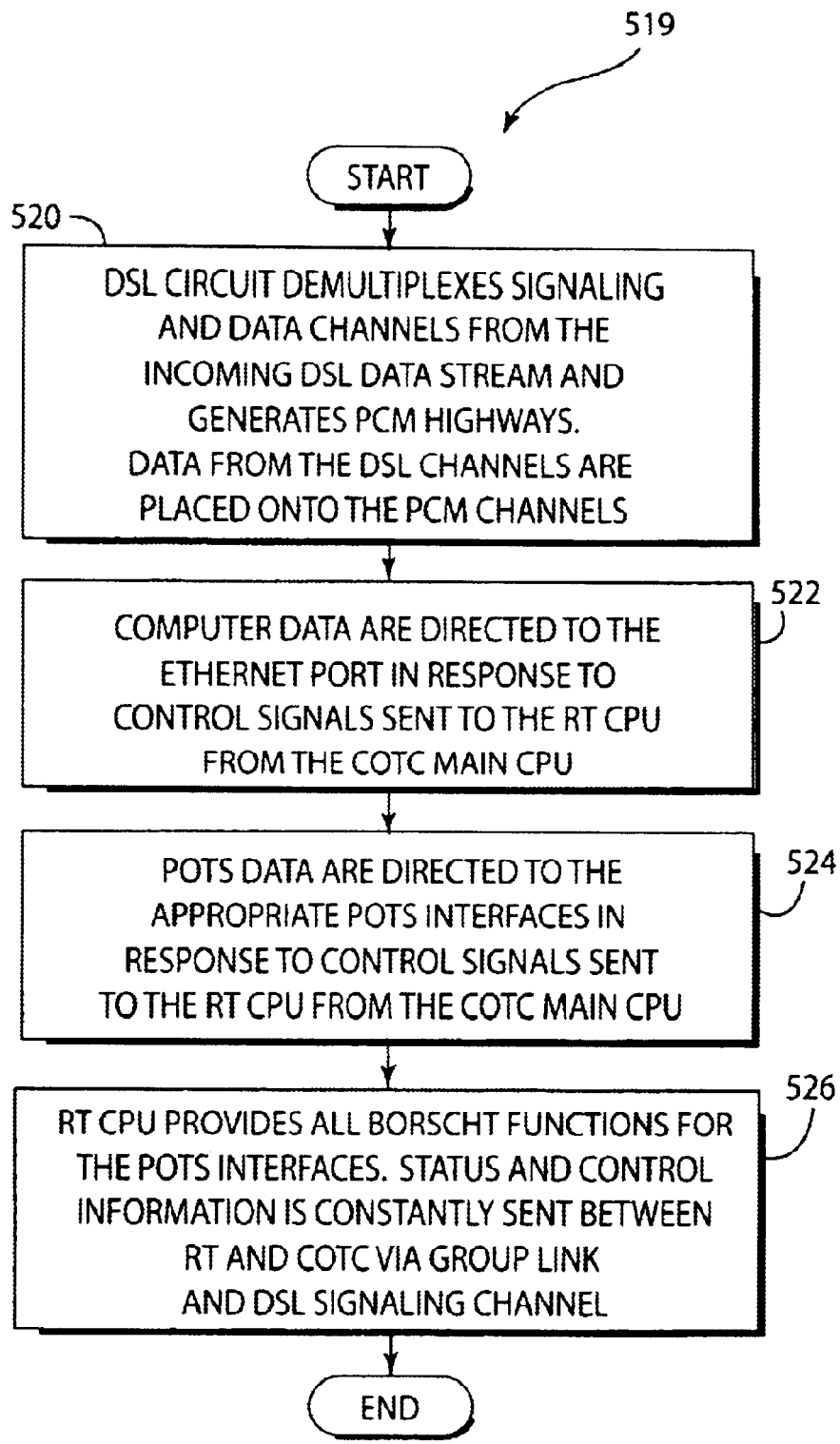
FIG. 6 is a flow chart illustrating remote terminal CPU steps when a call is received.

FIG. 6 discloses, in more detail, the steps performed by CPU 126 of the remote terminal 120 of FIG. 4. Referring to FIG. 6, at step 520 the DSL interface circuit 124 (FIG. 4) de-multiplexes data and commands that are received over the DSL line 122. The data is sent by the DSL interface circuit 124 (FIG. 4) to the PCM highway 136 (FIG. 4), while the commands are sent via link 128 (FIG. 4) to CPU 126 (FIG. 4). At step 522 of FIG. 6, the Ethernet interface 132 receives commands on control bus 130 from CPU 126 (FIG. 4) that identifies the PCM channels on PCM highway 126 that contain data that is destined for the subscriber data port 134 (FIG. 4). These commands on control bus 130 (FIG. 4) are received over a signaling channel on DSL line 122. Similarly, at step 524 of FIG. 6 the CPU 136 (FIG. 4) sends commands over control bus 130 (FIG. 4) that inform POTS interface 134 that voice signals are contained within certain PCM channels on PCM highway 136 (FIG. 4). The information is provided to CPU 126 via a signaling channel on DSL line 122.

At step 526 of FIG. 6, CPU 126 of the remote terminal 120 (FIG. 4) provides all the BORSCHT functions for the POTS interface 134 over the control bus 130 (FIG. 4). Status and control information is constantly sent between the remote terminal 120 (FIG. 4) in the central office terminal controller 70 (FIG. 3) via a signaling channel on the DSL line 122 (FIG. 4).

Figure 7:
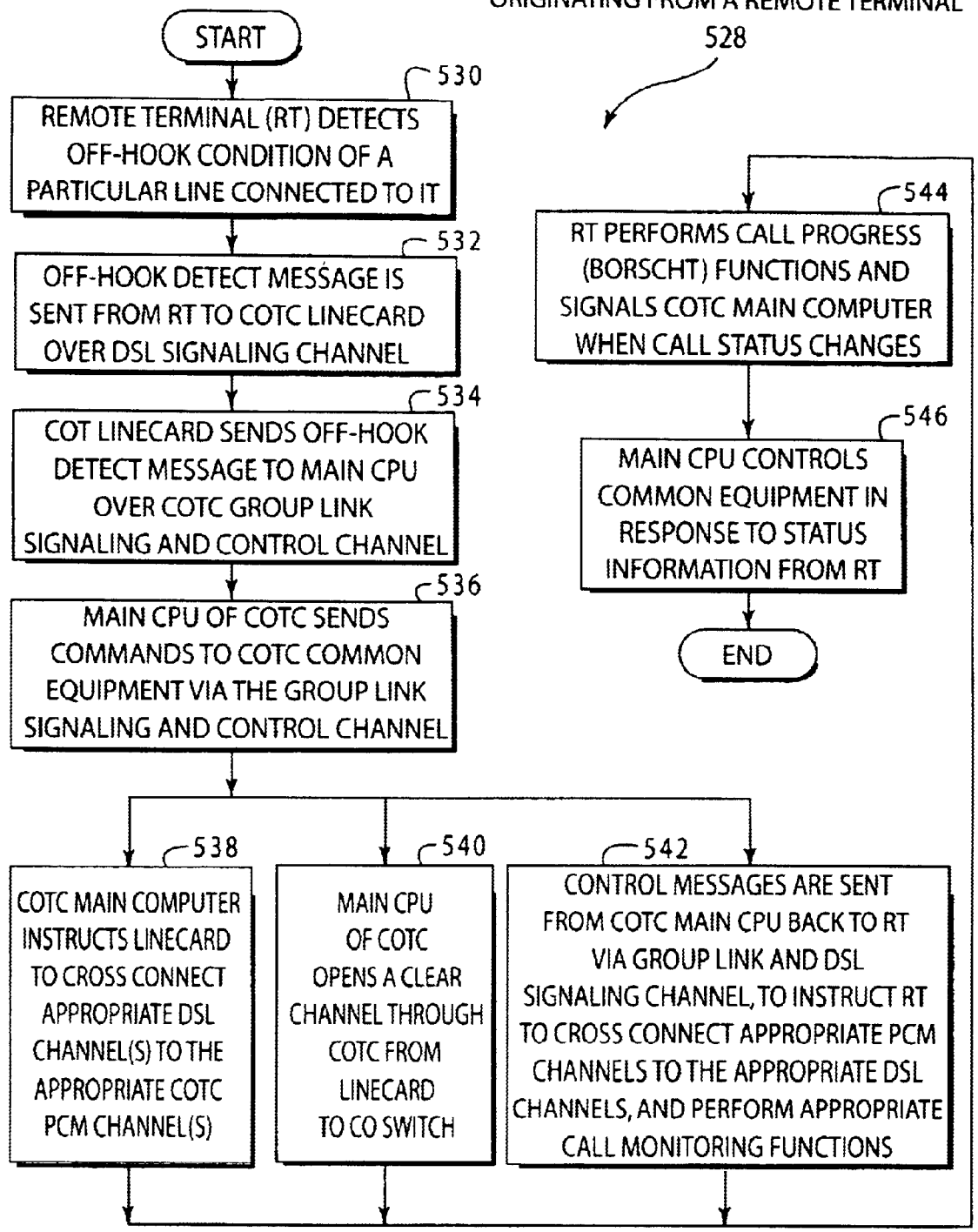
FIG. 7 is a flow chart illustrating steps for voice calls from a remote terminal.

FIG. 7 is a flow chart 528 of the operations performed for a call originating from a remote terminal. At step 530 of FIG. 7, the remote terminal detects an off-hook condition of a particular phone line that is connected to the remote terminal. At step 532 of FIG. 7, an off-hook detection message is sent from the remote terminal to line card 102 (FIG. 3) over a DSL signaling channel. CPU 126 of (FIG. 4) detects an off-hook detection via control bus 130 (FIG. 4) and sends a message over command link 128 to the DSL interface circuit 124. DSL interface circuit sends the message on a signaling channel on DSL line 122 to the line card 102. The message that is sent to the main CPU 110 (FIG. 3) is that an off-hook condition exists and a clear channel is desired for transmission of a voice signal. At step 534 the central office terminal controller line card 102 (FIG. 3) sends an off-hook detect message via grouplink 118 to the main CPU 110 (FIG. 3) requesting that an open channel be established for the transmission of a voice signal from the remote terminal. At step 536, the main CPU 110 (FIG. 3) sends commands to the switch matrix 92 and network interface card 86 (collectively referred to as the "common equipment"), via the grouplink 116 to request that an open channel be established.

As further shown in FIG. 7, three things happen simultaneously at steps 538, 540 and 524. At step 538 the main CPU 110 generates a command on grouplink 118 to instruct the line card 102 to cross connect the DSL channel on which the voice call has been established by the remote terminal to a particular channel on a PCM highway 98, all of which are shown in FIG. 3. At step 540, and at the same time, the main CPU 110 opens a clear channel through switch matrix 92 to the central office switch 10, which is shown in FIG. 3. To perform the process illustrated in step 540, a number of commands must be sent to set up the appropriate connections between the central office switch 10 and remote terminal 38. For example, a message must be first sent from the main CPU 110 via grouplink 116 to the central office switch 10 that a call is going to be transmitted on one of the T-1 lines 68. The main CPU 110 transmits this message over the grouplink 116 to CPU 802 (FIG. 13) in the network interface card 86. The message transmitted over the grouplink 116 is sent to the central office switch 10 over a signaling channel on one of the T-1 lines 68. The message from the main CPU 110 informs the central office switch that a call is coming into the central office switch on a specific T-1 line. During initial setup, specific T-1 lines 68 were assigned for specific POTS devices 56, all of which is shown in FIG. 3. The central office switch 10 in return indicates over the T-1 line through a signaling channel, that a particular T-1 channel has been designated for transmission of the call. That message is then transmitted via the grouplink 116 to the main CPU 110. The network interface card 86 cross connects the channel on the PCM highway 90 that switch matrix 92 has designated for the call, to the correct T-1 channel 68 that is connected to the central office switch 10. Again, the T-1 line selected for the T-1 channel is the same T-1 line that is used to transmit the voice signal. All of these T-1 lines are designated during system initialization and user configuration. Each one of the T-1 lines 68 has 24 TDM channels which are dynamically allocated based upon their utilization and availability. The central office switch 10 selects the particular channel on which the voice signal is going to be transmitted and provides that information via a message on the signaling channel of that same T-1 line which is transmitted back to the main CPU 110 via grouplink 116. All of these components referred to above are shown in FIG. 3.

As also shown in the flow diagram of FIG. 7, at step 542 the main CPU 110 sends control messages via grouplink 118 to line cards 102. Line cards 102 forward these control messages via a DSL signaling channel to the remote terminal. Each of these elements is shown in FIG. 3. The remote terminal 120 cross connects the channel on the PCM highway 126 to the correct channel on DSL line 122. Each of these elements is shown in FIG. 4. Control messages are also sent from the main CPU 110 (FIG. 3) to CPU 126 (FIG. 4) to perform the appropriate call monitoring functions as specified at step 542 FIG. 7.

As also shown in FIG. 7, at step 544 the remote terminal performs call progress (BORSCHT) functions and provides messages to the main CPU 110 when the status of a call changes, such as when a caller hangs up. In other words, once an open, clear channel is set up between the POTS devices 56 and the central office switch 10, the remote terminal monitors the call to detect any change in status. At step 546, the main CPU 110 provides controls to the switch matrix 92 and network interface card 86 via grouplink 116 in response to status information from the remote terminal.

Figure 8:
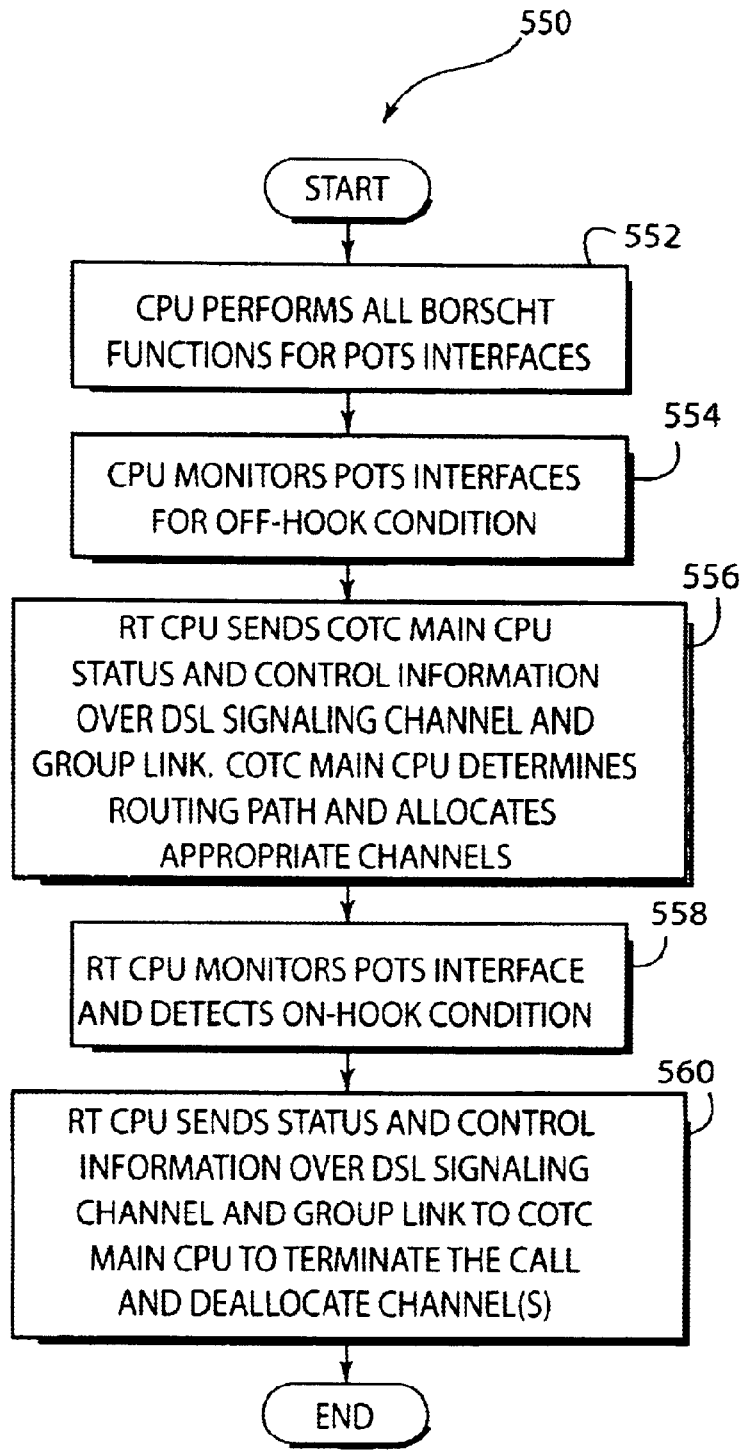
FIG. 8 is a flow chart illustrating remote terminal CPU steps for voice calls from a remote terminal.

FIG. 8 discloses a flow diagram describing the functions performed by the remote terminal when a phone call originates from a remote terminal POTS interface, such as illustrated in FIG. 4. All of the devices referred to below are illustrated in FIG. 4 except as indicated. Referring to FIG. 8, at step 552 CPU 126 performs all of the BORSCHT functions for the POTS interface 34. At step 554 the CPU 126 monitors the POTS interface 134 to detect off-hook conditions. At step 556, the CPU 126 sends main CPU 110 (FIG. 3) status and control information over a signaling channel of DSL line 122. This information is then transmitted to the main CPU over a grouplink 118 (FIG. 2) from the line card 102 (FIG. 3). Main CPU 110 (FIG. 3) determines the routing path and allocates appropriate channels at step 556, and as indicated above with reference to FIG. 7. At step 558, CPU 126 monitors the call and detects if an on-hook condition (hang-up) exists. At step 560, when an on-hook condition exists, CPU 126 sends status and control information over a signaling channel on DSL line 122 to line card 102 (FIG. 3) which are transmitted via grouplink 118 (FIG. 3) to main CPU 110 (FIG. 3). Main CPU 110 (FIG. 3) then terminates the call and places the channel in a status so that they can be reallocated.

Figure 9:
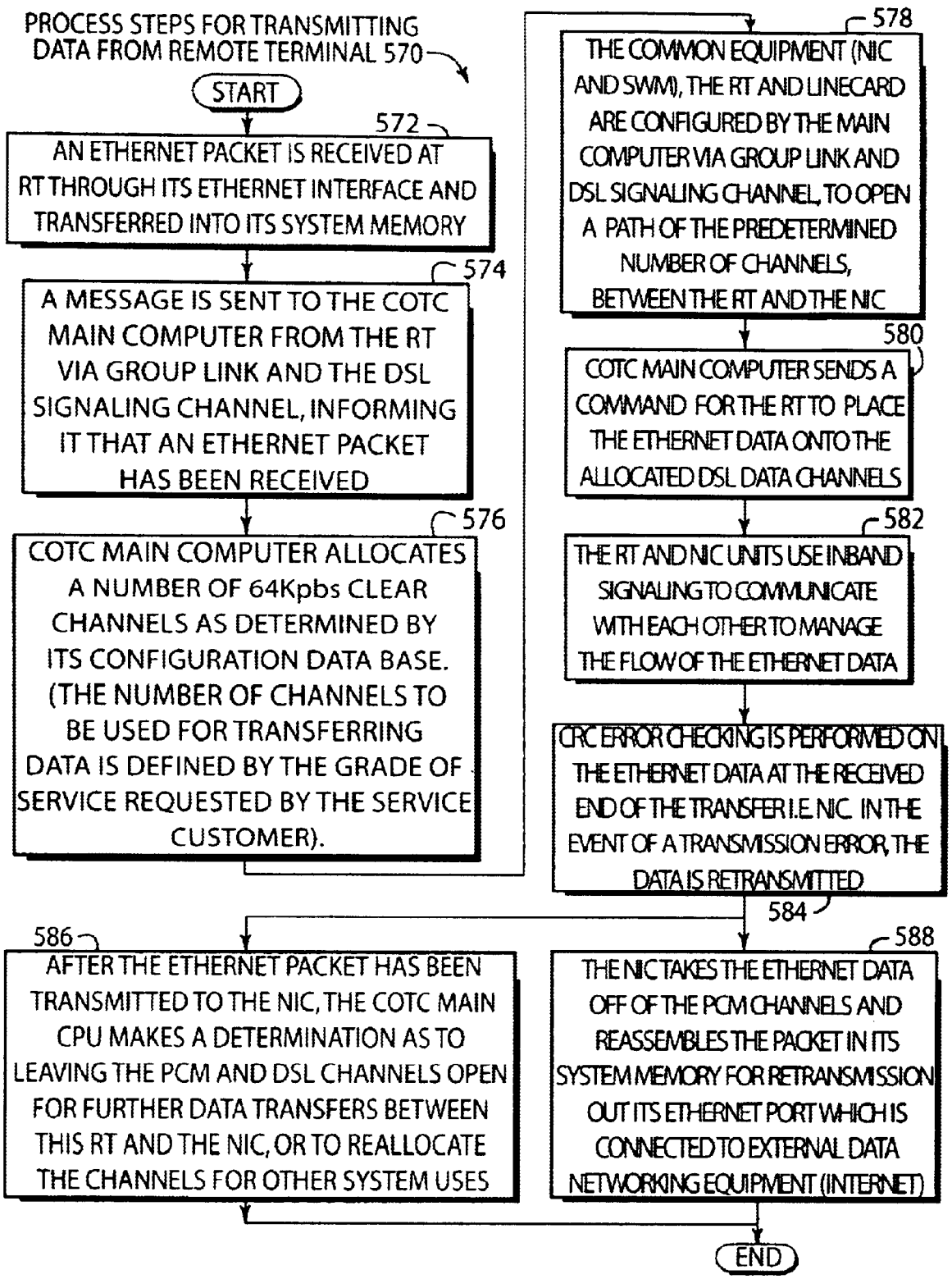
FIG. 9 is a flow chart illustrating steps for transmitting data from a remote terminal.

FIG. 9 illustrates a flow diagram 570 of the steps that are performed when data is transmitted from a data device 59 at a remote terminal to router 80, as illustrated in FIG. 3. Referring to FIG. 9, at step 572 data device 138 transmits data packets to Ethernet interface 132 that are stored in system memory of the remote terminal 120. At step 574, CPU 126 receives a message from the Ethernet interface 132 via control bus 130 and sends a message via command 128 on a signaling channel of the DSL line 122 to main CPU 110 (FIG. 3) informing the main CPU 110 that an Ethernet packet has been received by the remote terminal 120. All of these devices are shown in FIG. 4 except as indicated.

Referring again to FIG. 9, at step 576 the main CPU 110 allocates a number of 64 kilobyte/second free channels as determined by the configuration database and the number of channels that are available, i.e. not being used by POTS devices. The configuration database stores the grade of service to which the customer has subscribed. For example, a customer may subscribe to 6 channels, 12 channels, 18 channels, etc. Additionally, customer equipment such as connectors and other devices may limit the number of channels to which the customer can subscribe. Hence, within the current constraints of the customer system, the customer can subscribe to a varying number of channels. The main CPU 110 allocates all of the open channels that are not being used by POTS devices 56, as available channels for transmission of data. At step 578 of FIG. 9, the switch matrix 92, network interface card 86, remote terminal 38 and the line cards 102 are configured by the main CPU 110 via grouplink 116 and grouplink 118 and the DSL signaling channel to open a predetermined number of channels between the remote channel and the network interface card 86. Again, the number of channels is determined by the number of channels to which the customer has subscribed minus the number of channels that are being used by the POTS devices.

At step 580 of FIG. 9, main CPU 110 sends a command over grouplink 118 and a DSL signaling channel to the remote terminal to place the Ethernet data from the data device 59 onto the allocated DSL data channels, as illustrated in FIG. 3. At step 582 of FIG. 9, the remote terminal and the network interface card then use in-band signaling to communicate with each other and manage the flow of the Ethernet data. In this manner, the main CPU 110 does not become involved with the flow of data between these two devices which could slow that flow of data. The remote terminal and the network interface card use signaling channels for this communication.

Figure 13:
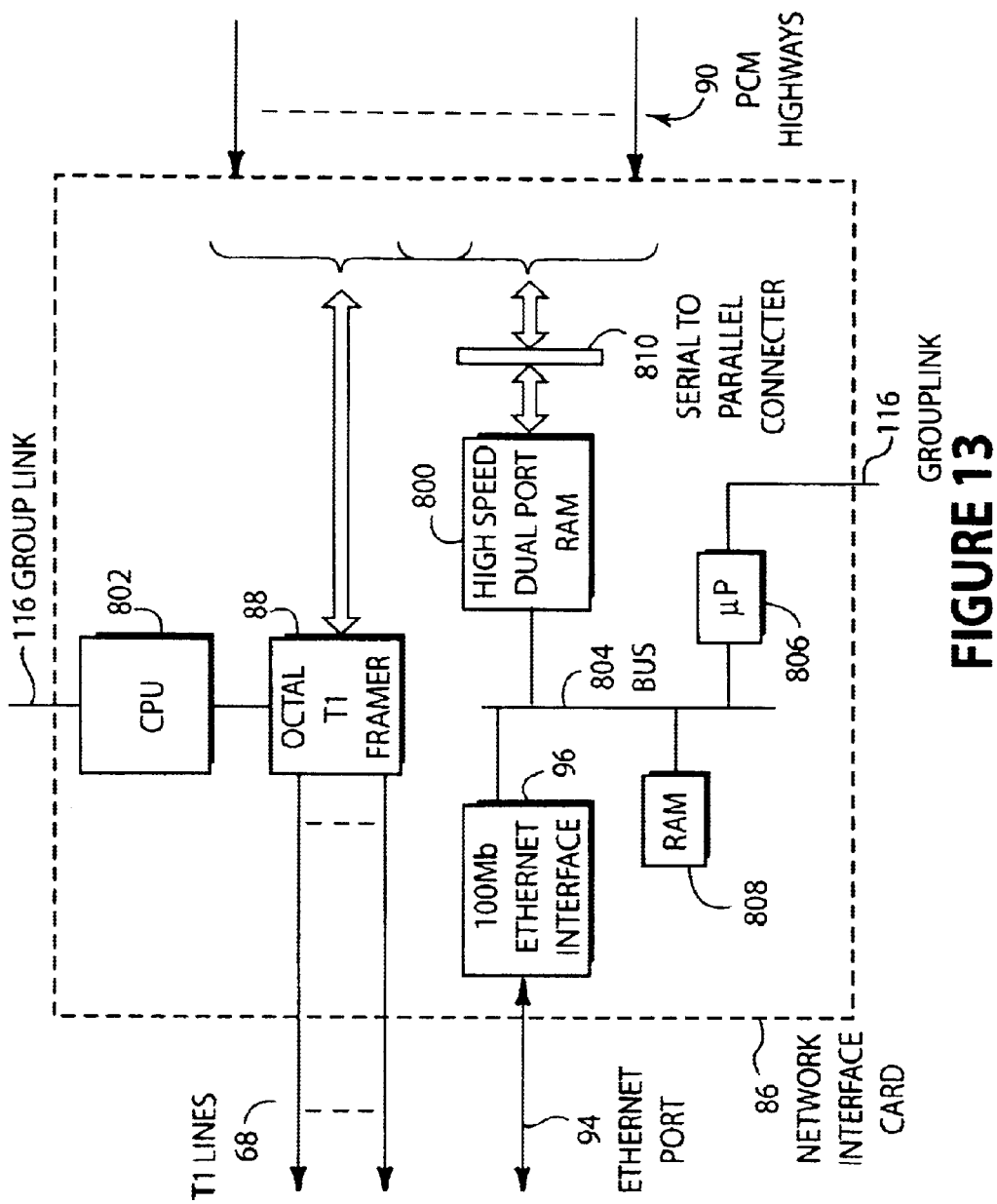
FIG. 13 is a block diagram illustrating components of the network interface card.

At step 584 of FIG. 9, CRC error checking is performed on the data in the network interface card 86. In the event of a transmission error, an in-band signal is sent from the network interface card to the remote terminal to request that the data be retransmitted. At step 586 of FIG. 9, after the Ethernet data packets have been transmitted to the network interface card 86, the main CPU 110 makes a determination as to whether channels that have been opened on the DSL lines and PCM highways should remain open for further data transfers between the remote terminal and the network interface card or to release these channels for other system uses. At step 588, the network interface card receives the Ethernet data packets from the PCM highways 90 and reassembles the data packets in the network interface card RAM 808 (FIG. 13). The data packets are then presented in the proper order to the Ethernet interface 96 so that the data can be transmitted to router 80.

As can be seen from the flow diagram of FIG. 9, all of the subscribed to and available channels are used to transmit the data from the data device 59 through the system to the Ethernet port 94. Because the data packets are divided up and sent in a parallel fashion, high data transmission rates can be achieved through the system illustrated in FIG. 3. The remote terminal 38 separates the data packets for transmission over the available channels, while the network interface card 98 reassembles those data packets in the proper order for transmission over the Ethernet data port 94.

Figure 10:
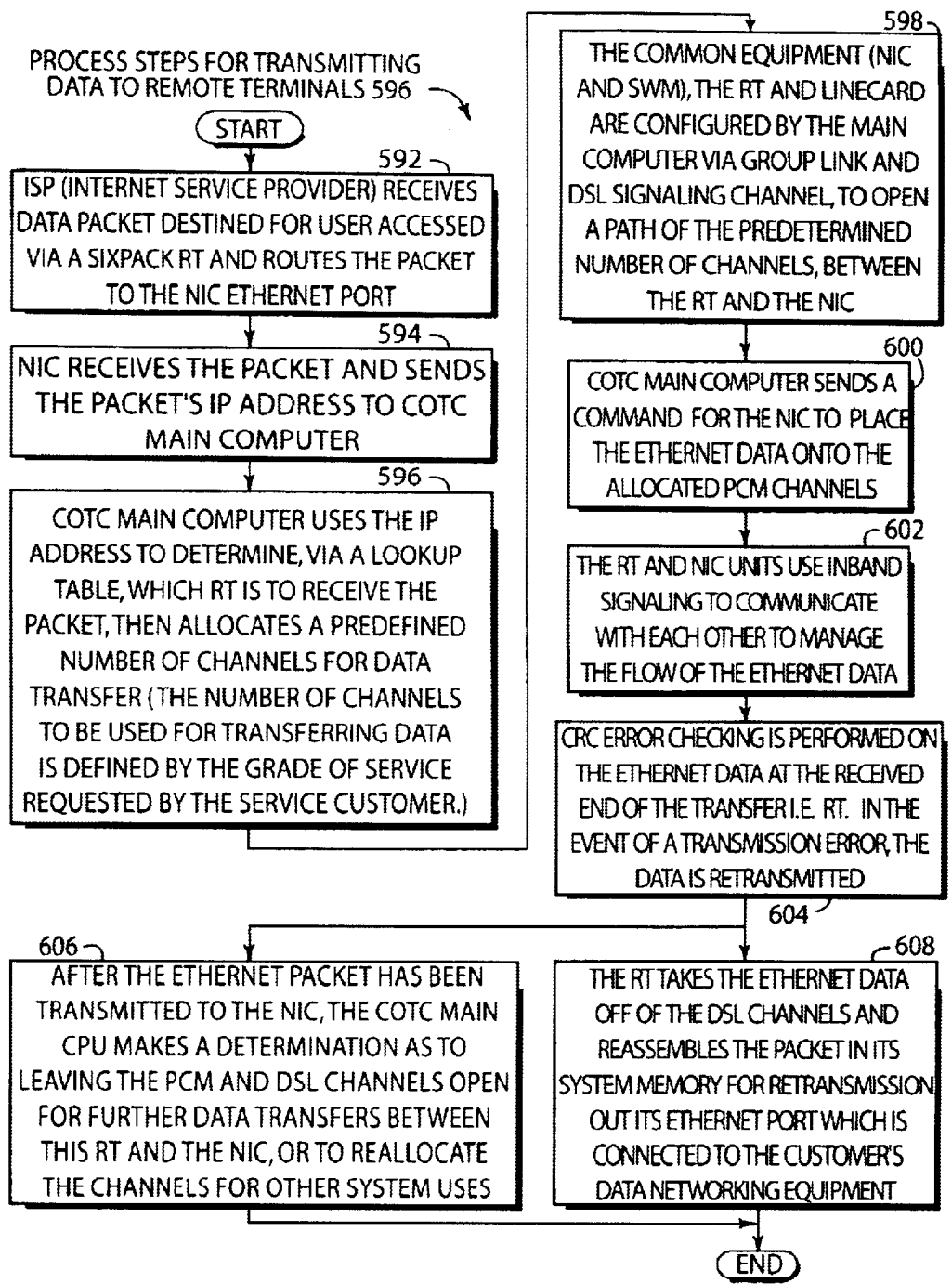
FIG. 10 is a flow chart illustrating steps for transmitting data to a remote terminal.

FIG. 10 is a flow diagram 590 of the steps performed in transmitting data from the network interface card port 94 through the system to a data device 59. At step 592 of FIG. 10, an Internet Service Provider receives a data packet that is destined for a user that is connected to a remote terminal of the system of the present invention. The Internet Service Provider routes the packet to router 80, which in turn routes the data to the network interface card 86. This is done by standard addressing schemes. At step 594, the network interface card receives the data packet and transmit the IP address of the data packet to the main CPU 110 via grouplink 116. At step 596, the main CPU 110 uses the IP address of the data to determine, via a look-up table, which remote terminal should receive the data packet. Again, the number of channels is selected, as disclosed above, by considering the grade of service to which the customer has subscribed (which may be limited by the customer equipment) and the number of channels that are available that are not being used by POTS devices. All of the available channels are then used to transfer the data in a parallel fashion to maximize the data transfer rate.

At step 598 of FIG. 10, the main CPU 110 configures the network interface card 86, the switch matrix 92 and the line cards 102 to open a path on the channel selected for transmission of the data. Additionally, the main CPU 110 transmits messages to the line cards 102 that are placed in the signaling channel for transmission to the remote terminal 38, which is used by CPU 136 (FIG. 4) to establish an open channel on PCM highway 136 and Ethernet interface 132 to the subscriber data port 135. In this fashion, a plurality of clear parallel channels are established between Ethernet interface 96 (FIG. 3) and Ethernet interface 132 (FIG. 4).

At step 600 of FIG. 10, the main CPU 110 sends a command to the network interface card 86 to place the Ethernet data that has been stored on the network interface card 86 onto the allocated channels of PCM highway 90 and the other allocated channels through the system. At step 602, the remote terminal and the network interface card use in-band signaling to communicate with each other, and thereby manage the flow of the Ethernet data that is being transferred through the system. These messages are similar to ACQ and REQ signals that are commonly used in transferring data. At step 604, CRC error checking is performed on the Ethernet data by the remote terminal device. In the event of a transmission error, the data is then retransmitted.

As shown in FIG. 10, steps 606 and 608 occur approximately simultaneously. At step 606, after the Ethernet packets are transmitted from the remote terminal to the network interface card, the main CPU 110 makes a determination as to whether or not the PCM and DSL channels through the system should remain open or if they should be released for other system uses. Once a data packet has been transmitted through the system, the system essentially remains idle since both the receiving end and sending end recognize that the transmission has been completed. There is no need to take any other action. The system is essentially ready at that point for reallocation of another data transmission or voice signal transmission. In this manner, optimum utilization of the system can be achieved. Simultaneously, at step 608, the remote terminal receives the Ethernet data from the DSL channels, stores the data and then generates a link file so that the data can be reassembled for transmission through the subscriber data port 58 (FIG. 3).

In-band signaling is used to speed up the data flow through the system. Grouplinks, although they are inherently slow, work well for high level messaging to set up and allocate channels since the few milliseconds that it takes to perform these functions is very small with respect to the physical actions that are taking place. For example, a few milliseconds that is required to detect an off-hook condition is very small when compared to the amount of time it takes the user to actually move the phone headset to the user's ear. However, when moving a data packet through a system, the grouplink channel is very slow. Once a channel is open for transmission of a packet of data, in-band signaling allows the actual data channels between the remote terminal and the network interface card to be used to communicate information regarding the transmission of data. For example, in-band signaling works well for indicating that a channel has been established and data is being transmitted.

Figure 11:
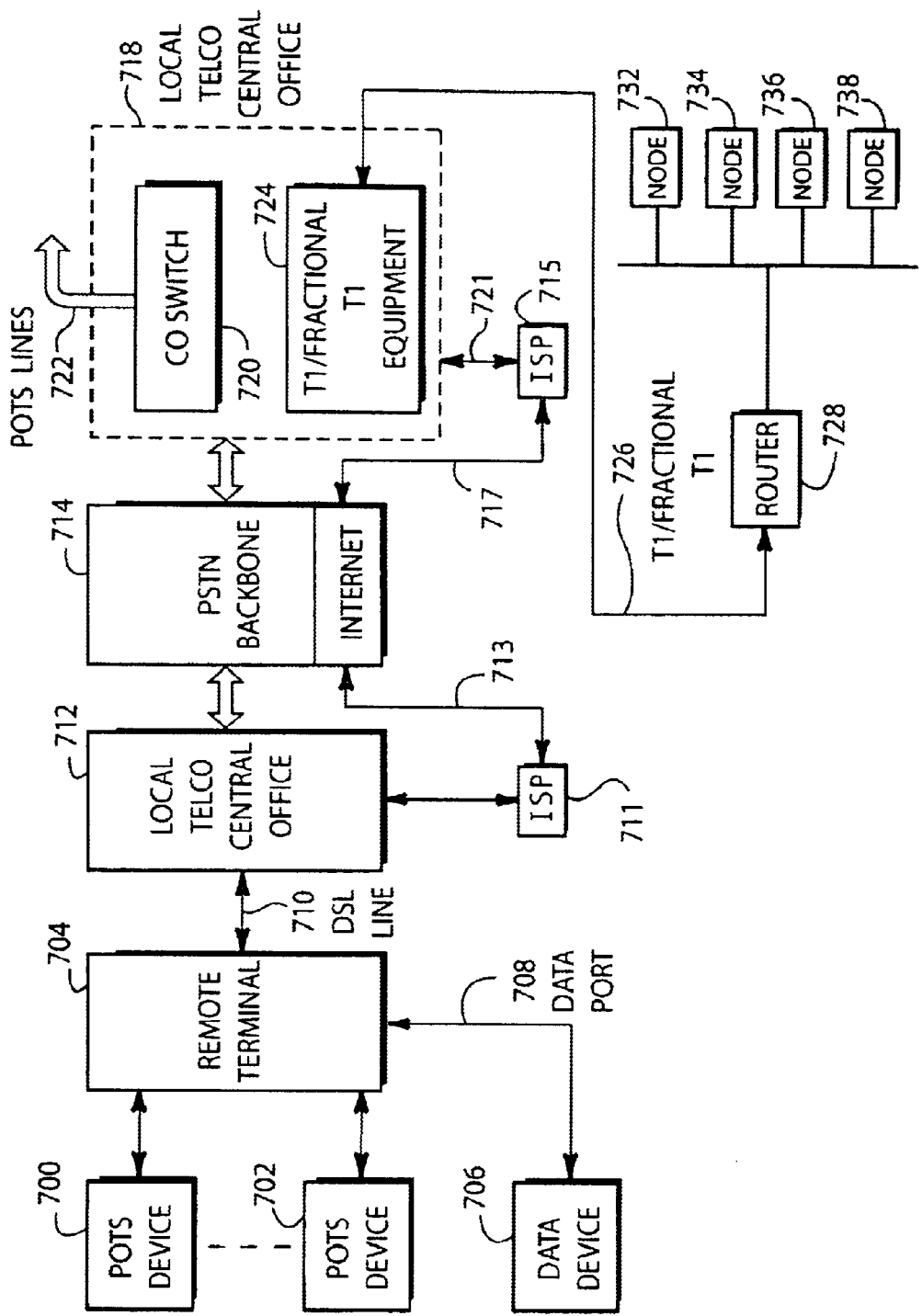
FIG. 11 illustrates another configuration of the present invention.

FIG. 11 illustrates another configuration in which the present invention can be implemented. As shown in FIG. 11, a series of POTS devices such as POTS devices 700, 702 are connected to a remote terminal 704, in the same manner as illustrated in FIG. 3. Additionally, a data device 706, such as a computer, is connected to the remote terminal 704 via a data port 708. Again, these devices are connected to the remote terminal 704 in the manner described above with regard to FIG. 3. Further, DSL line 710 connects the remote terminal to the local Telco Central Office 712 that has a central office terminal controller, such as illustrated in FIG. 3. Numerous remote terminals can be connected to the local Telco Central Office 712 via numerous DSL lines, as also described above. Telco Central Office 712 is connected to the public switch telephone network backbone, which is schematically illustrated as block 14. The public switch telephone network backbone 714 is then connected to a plurality of additional Telco Central Offices, such as local Telco Central Office 718. The local Telco Central Office, in accordance with the configuration of FIG. 11, does not contain a central office terminal controller 70 (FIG. 3). Rather, the local Telco Central Office 718 uses standard switching equipment that is commonly available in Telco Central Office. For example, local Telco Central Office 718 includes central office switches 720 that control the switching of POTS lines 722. Similarly, data switching equipment, such as T-1/fractional T-1 equipment 724, is typically available in local Telco Central Office to provide data services to customers. As illustrated in FIG. 11, T-1/fractional T-1 equipment 724 is connected by T-1/fractional T-1 service 726 to router 728 that is disposed at a customer location. The router 728 is a router that converts the T-1 data to be placed on a data network, such as LAN 730, having a plurality of nodes, such as nodes 732, 734, 736, 738.

As also shown in FIG. 11, Telco Central Office 712 is typically connected to an Internet Service Provider 711 which, in turn, is connected to a high-speed communication line 713 to the Internet. The PSTN backbone 714 comprises a portion of the Internet together with other private communication links that are available to the ISP 711 for transmitting data. Similarly, ISP 715 is connected to the Internet through high-speed communication line 717 and to local Telco Central Office 718 through communication line 721. These communication links are also schematically illustrated in FIG. 1. The configuration of FIG. 11 illustrates that local Telco Central Offices, such as local Telco Central Office 712, can implement the present invention using a central office terminal controller 70 (FIG. 3) and be compatible with currently existing telecommunication systems that are presently in existence throughout the world.

Figure 12:
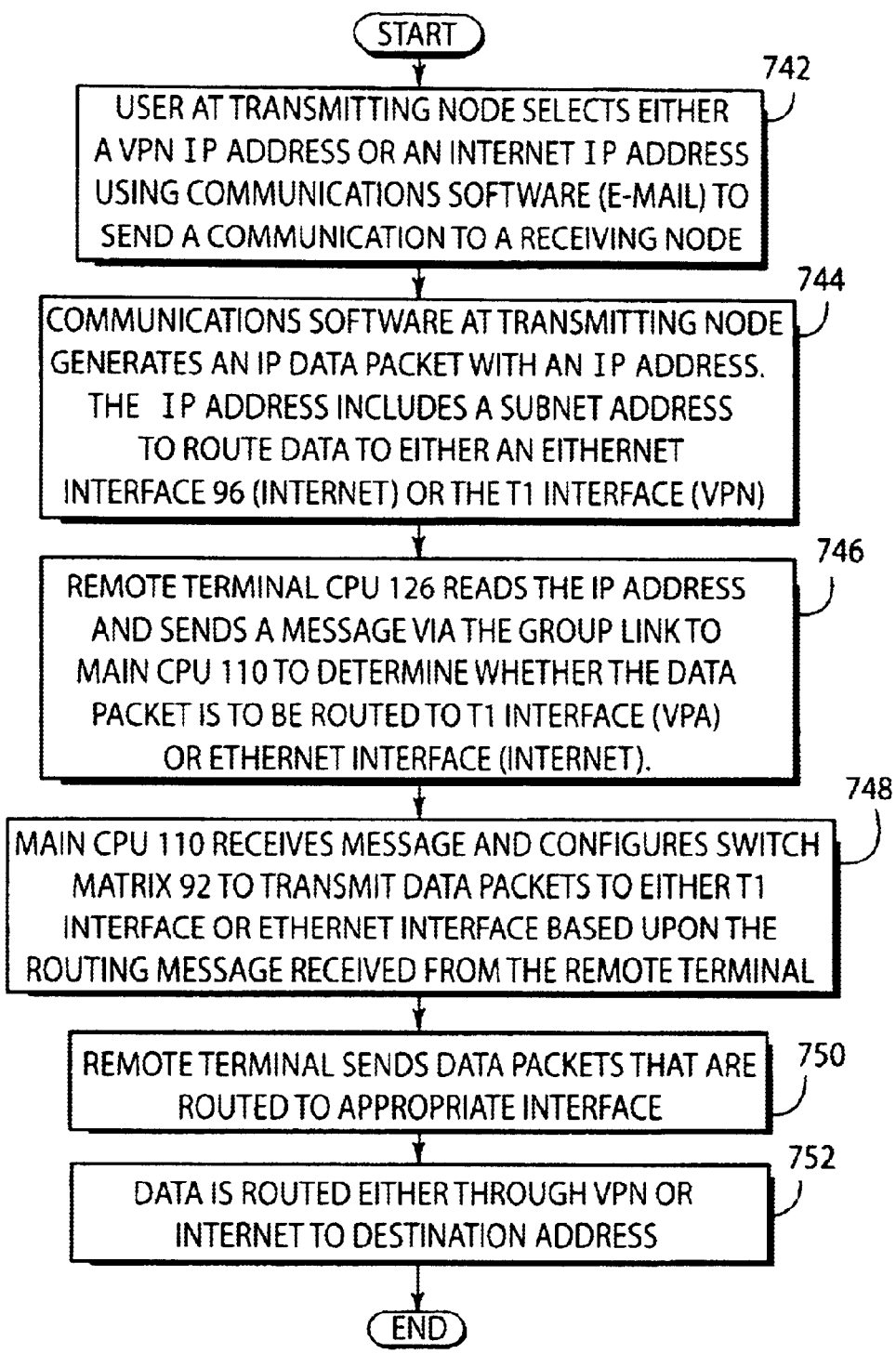
FIG. 12 is a flow chart illustrating steps for transmitting data on a virtual private network.

FIG. 12 discloses the process steps 740 for transmitting data in a secure manner on a Virtual Private Network (VPN) or over the Internet, using the configurations illustrated for implementing the present invention, such as shown in FIGS. 3 and 11. Referring to FIG. 12, at step 742, a user may desire to transmit information either over a Virtual Private Network, that can be established in accordance with the present invention, or in the standard manner through standard Internet connections that have been described above. Application software at the transmitting node, such as at data device 59 (FIG. 3) or data device 706 (FIG. 11) is configured to allow selection of different e-mail addresses for transmission over different communication paths, i.e. either over a secure Virtual Private Network or through the Internet. Each of the IP addresses includes subnet addressing information that is used by the remote terminal 38 and central office terminal controller 70 (FIG. 3) to route the data packets in the proper fashion. At step 744, the application software generates an IP data packet that includes the IP address that has been selected by the user to route the data either through the Ethernet interface 96 (FIG. 3) or the T-1 interface (octal 88). At step 746 of FIG. 12, the remote terminal CPU 126 (FIG. 4) reads the IP address and determines whether the data packet from the data device 59 (FIG. 3) is to be sent to the central office switch 10 or to the Ethernet interface 96. Again, this information is derived from the subnet addresses that are included in the IP address by the communication software at the transmitting node. The remote terminal CPU 126 then sends a message via the grouplink to the main CPU 110 (FIG. 3) to indicate whether the data packet is to be routed to the T-1 interface for transmission over the Virtual Private Network, or to the Ethernet interface for transmission over the Internet. At step 748, the main CPU 110 receives the message from the remote terminal and configures the switch 92 to transmit the data packets to either octal 88 for transmission over T-1 lines 68 to the central office switch 10 through the Virtual Private Network, or the Ethernet interface 96 for transmission to router 80 and an ISP. At step 750, the remote terminal 38 sends the data packets which are routed to the appropriate interface. At step 752, the data is then routed either through the Virtual Private Network through central office switch 10, or to the Internet through ISP 82 or ISP 84 to the destination address.

As is apparent from the description of FIG. 12, the user can choose to either send data through a standard Internet connection, or through the central office switch 10 through a Virtual Private Network. As can be seen from FIGS. 1 and 11, a Virtual Private Network is established by sending data from a Telco Central Office through a PSTN backbone to another Telco Central Office. Telco Central Offices have established security measures that do not allow outside users to monitor and possibly reroute data transmissions. Security measures within Telco Central Offices provide a secure method of transmission of data between Telco Central Offices through the PSTN backbone. In contrast, ISPs have not implemented such security measures. For example, various algorithms are used by ISPs to route data through various Internet connections in the PSTN backbone to other ISPs or through Telco Central Offices for direct connection to remote locations. Unscrupulous computer users have been able to remotely program ISP routers to configure the router to transmit all data either to or from a certain IP address to the unscrupulous user so that the unscrupulous user can monitor such transmissions. Hence, users cannot be assured that communications through ISPs over the Internet are secure transmissions. The present invention allows the user to employ the security functions that have been provided in the Telco Central Offices to transmit data through the PSTN backbone and be assured that such transmissions are protected from monitoring by unscrupulous users, or to use the Internet to transmit data.

Once the data from the central office switch 10 has been transmitted to the PSTN backbone 714 (FIG. 11) or PSTN backbone 10 (FIG. 1), the data is then transmitted to a remote central office such as Telco Central Office 718 (FIG. 11), or Telco Central Office 14 (FIG. 1). In accordance with the implementation of FIG. 1, the data can then be sent over DSL lines, or over currently available data transmission paths, such as illustrated by T-1/fractional T-1 equipment 724, router 728, and LAN 730. As illustrated in FIG. 1, this manner of transmitting data can also be employed in data device 60 for transmission back to data device 52. With regard to FIG. 11, nodes 732–738 can also include communication software that allows the generation of IP addresses for transmission over the Virtual Private Network back to data device 706. In this case, the router 728 places data for secure transmissions on predetermined channels on the T-1/fractional T-1 router 726 so that data is transmitted through the PSTN backbone 714 directly from the local Telco Central Office 718. Again, the IP address of the destination node includes a subnet address that allows the router 728 to place the data transmission on the particular channels of the communications link 726 for proper routing within the local Telco Central Office 718. Alternatively, switching equipment within the local Telco Central Office 718 can be used to route the data either to the ISP 715 or to the central office switch for a secure transmission over the PSTN backbone 714.

The ability to select the routing of messages either through a VPN or the Internet need not employ the DSL technology that has been disclosed with reference to FIGS. 1 through 10. For example, standard communication connections, such as illustrated with respect to Telco Central Office 718, router 728, and LAN 30 can be employed on both ends of the communication network and communication software can be employed to utilize these alternative modes of transmitting data. For example, nodes 732–738 can utilize communication software that provides IP addresses for communication over a Virtual Private Network or a standard Internet connection. A communication network similarly configured and connected to another Telco Central Office can also utilize this software for transmission of data back through the Virtual Private Network or through a standard Internet connection. In this manner, the DSL connections of the present invention are not required to implement this embodiment of the invention.

The present invention can also be configured to allow telephone communication through IP telephony. In accordance with the present invention, specific phones, such as POTS devices 56 (FIG. 3) can be allocated to be connected to channels that are designed in the system to be connected by the switch matrix 92 to Ethernet interface 96. In this manner, IP telephony signals can be transmitted through the Internet. Similarly, special codes can be entered by the POTS device 56 to send a messaging signal through line card 102 to main CPU 110 to configure the switch matrix 92 such that the POTS device 56 transmits signals to the Ethernet interface 96 rather than the central office switch 10. These codes can be configured to provide the switching for switching matrix 92 in the manner described herein.

FIG. 13 is a schematic block diagram illustrating the components of the network interface card 86 in more detail. PCM highways 90 transmit data to the network interface card 86 as described above. In a typical implementation, eight PCM highways may be provided. As shown in FIG. 13, several of the PCM highways may be connected to octal T-1 framer 88. Similarly, other PCM highways may be connected to the high-speed dual port RAM 800. As shown, there may be some overlap in which several of the PCM highways are connected to both the octal T-1 framer 88 and high-speed dual port RAM 800. This provides some flexibility in providing sufficient channels to both routes of communication. The octal T-1 framer 88 in accordance with the preferred embodiment derives eight T-1 interfaces from the PCM highway channels, that are connected to T-1 line 68. Octal T-1 framer 88 operates in response to commands from CPU 802 that is, in turn, connected to grouplink 116 that transmits commands from the main CPU 110. The T-1 lines 168 are then connected to the central office switch 10. Connection through the T-1 lines 68 corresponds to connection to the Virtual Private Network described above.

As also shown in FIG. 13, several of the PCM highways 90 are connected to a serial to parallel converter 810 which, in turn, is connected to a high-speed dual port RAM 800. The high-speed dual port RAM 800 places the serial data from the PCM highways 90 in a parallel format and downloads the parallel data to bus 804. Bus 804 can comprise a PDM bus or PCM bus, for example. Microprocessor 806 causes the parallel data from the high-speed dual port RAM 800 to be loaded into RAM 808. Microprocessor 806 builds Ethernet packets from the data and performs CRC error correction. The microprocessor 806 receives commands from the grouplink 116 that is connected to the main CPU 110. The Ethernet packets are then downloaded from the bus 804 into the Ethernet interface 96. The Ethernet interface 96 then serializes the parallel data for transmission across Ethernet port 94. Ethernet port 94 is connected to an ISP that transmits and receives data over the Internet, as described above.

Figure 14:
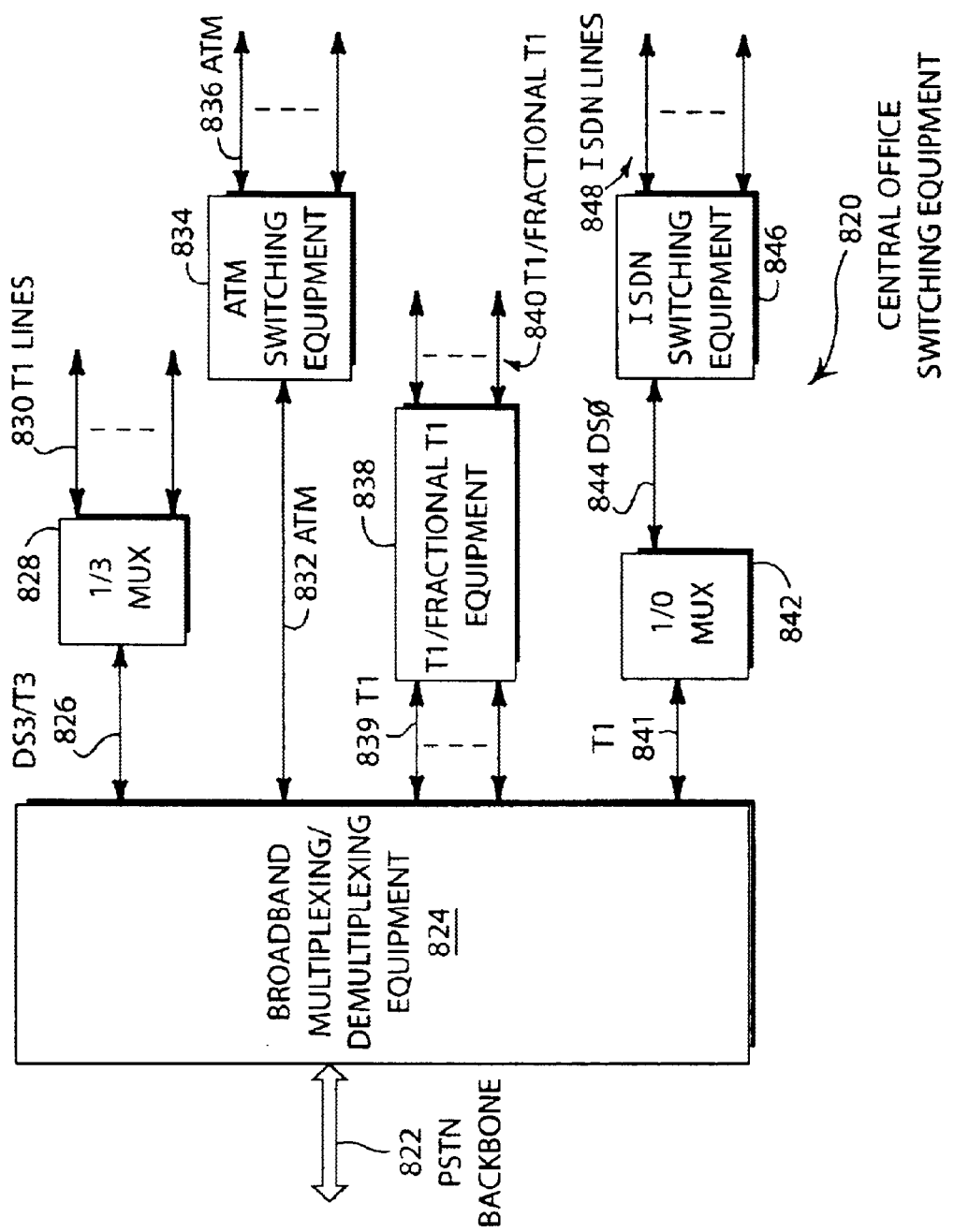
FIG. 14 is a schematic illustration of various central office switching equipment.

FIG. 14 is a schematic illustration of various central office switching equipment 820 that is used in a central office such as Telco Central Offices 718 illustrated in FIG. 11. As shown in FIG. 11, T-1/fractional T-1 equipment 724 is illustrated as one example of switching equipment that can provide a direct connection of digital data to a customer from the Telco Central Office 718. FIG. 14 illustrates other switching equipment that can be used. As shown in FIG. 14, the PSTN backbone is connected to the central office switching equipment through connection 822. Broadband multiplexing/demultiplexing equipment 824 demultiplexes data received from the PSTN backbone and provides the data to various types of switching equipment. For example, the broadband multiplexing/demultiplexing equipment 824 may provide DS3/T3 outputs 826 that are provided to a 1/3 multiplexer 828 that provides T-1 lines 830. Similarly, broadband multiplexing/demultiplexing equipment 824 may provide a high-speed ATM output 832 that is connected to ATM switching equipment 834 that generates multiple ATM outputs 836. As also shown in FIG. 14, the broadband multiplexing/demultiplexing equipment 824 can produce a number of T-1 lines that are connected to T-1/fractional T-1 equipment 838. This equipment can perform switching functions such as switching T-1 channels on T-1 lines 839 to channels on T-1 lines at output 840, or provide fractional T-1 outputs. This is similar to the equipment illustrated in FIG. 11. As further shown in FIG. 14, a T-1 line 841 can be connected to a I/O mux 842 which produces a DS0 output 844. The DS0 output can then be provided to ISDN switching equipment 846 which produces a number of ISDN lines 848. Hence, many different varieties of switching equipment can be provided, such as illustrated in FIG. 14, that can replace the switching equipment 724 illustrated in FIG. 11. Of course, other types of switching equipment that is not illustrated can also be used in accordance with the present invention.

Figure 15:
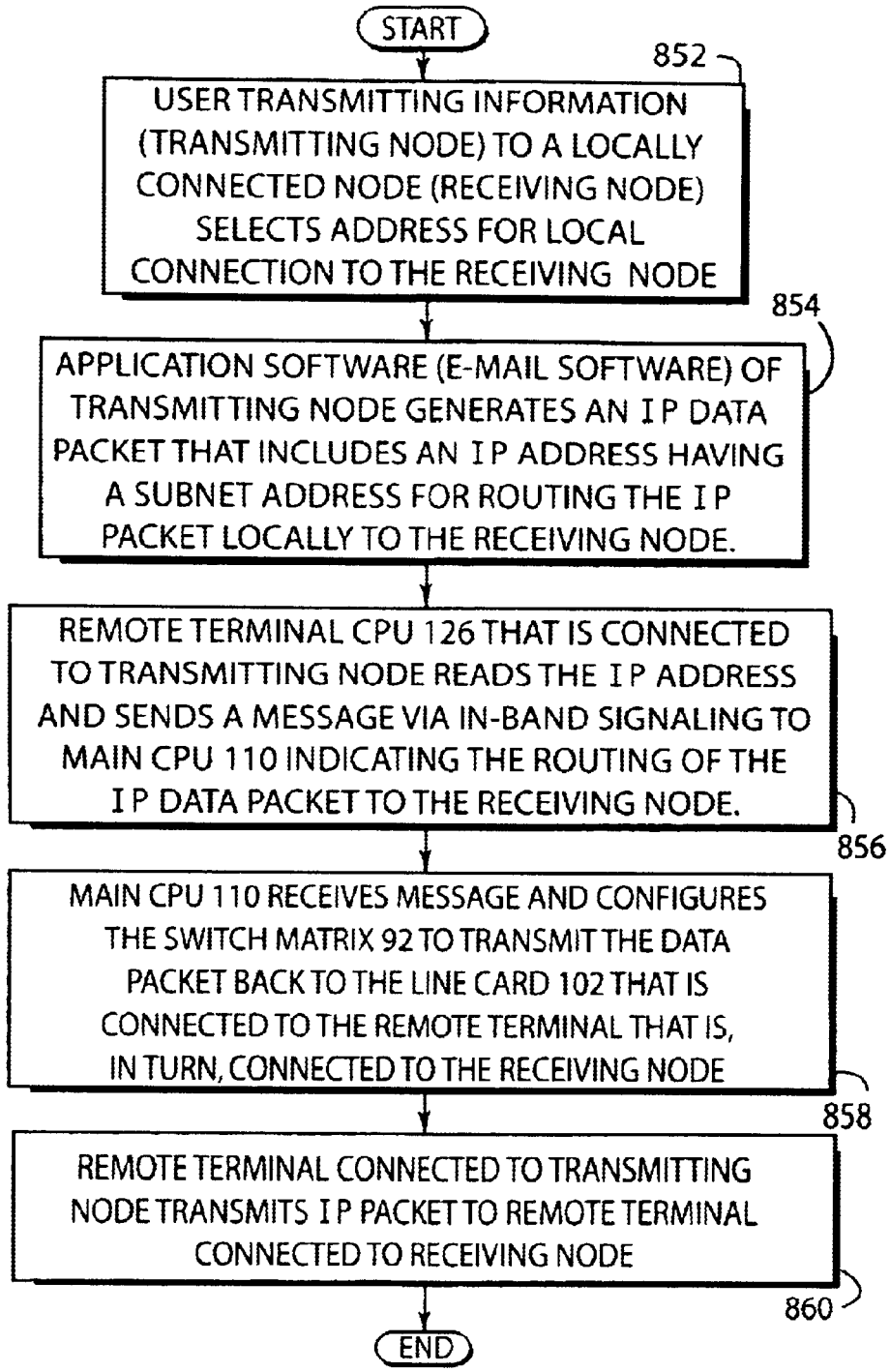
FIG. 15 is a flow chart illustrating steps for transmitting information to a locally connected node.

FIG. 15 discloses the process steps for another implementation of the invention illustrated in FIG. 3. By way of background, it would be desirable to be able to replace standard PBX switching systems with a system that would allow both telephone and data connections to be made through the local PBX. For example, a large PBX system may be provided on a university campus that allows callers to make voice calls directly to other phones connected to the PBX system without routing the calls through a local Telco Central Office. However, PBX systems such as this have to be substantially modified to allow high-speed data connections through the local PBX system. For example, data equipment as well as switching equipment would be required to provide the necessary data communication channels to allow a PBX system to provide local communication of data within the PBX system.

The architecture illustrated in FIG. 3 can be used in place of a standard PBX system to provide both data and voice communications within a local PBX system. In accordance with one implementation of the present invention, for example, remote terminals 38 can be provided to provide service to several rooms within a dormitory. Referring to FIG. 3, single or multiple data ports can be provided on the remote terminals 38, as desired, to allow connection of data devices 59. Additionally, multiple phones can be provided to the various rooms that are connected to the remote terminal 38. The central office terminal controller 70 can be located at a central location on the campus to replace the currently existing PBX equipment. DSL lines 104 can then be used to connect each of the remote terminals to the central office terminal controller. Data transmissions to other data devices 59 that are connected to central office terminal controller 70 via remote terminal 38 can be made in accordance with the process steps 850 of FIG. 15, as described below. Additionally, data devices 59 can connect to the Internet or through a Virtual Private Network, in the manner described above to either send or receive data. Phone calls between POTS devices 56 can also be made locally through the central office terminal controller or non-locally to other POTS devices located anywhere on the public switch telephone network.

Referring to FIG. 15, the process steps 850 for transmitting information to a locally connected node are illustrated. At step 852, a user that desires to transmit information from a data device 59 (transmitting node) selects an address of a locally connected receiving node, which comprises another data device connected to the central office terminal controller 70 of FIG. 3. As described above with regard to FIG. 12, the communication software package (e-mail software) generates a IP address that identifies a data device 59 that is connected to the central office terminal controller 70. The IP address contains subaddresses that identify the data device as being connected to the central office terminal controller 70. At step 854, the communication software of the transmitting node generates an IP data packet that includes this IP address having the subnet address of the locally connected receiving node. At step 856, the remote terminal CPU 126 (FIG. 4) that is connected to the transmitting node reads the IP address and sends a message via in-band signaling to main CPU 110 (FIG. 3) indicating the routing of the IP data packet to the receiving node. At step 858, the main CPU receives the routing message and configures the switch matrix 92 to transmit the data packet back to the line card 102 that is connected to the remote terminal 38 which, in turn, is connected to the receiving node. At step 860, the remote terminal connected to the transmitting node transmits the IP packet to the remote terminal connected to the receiving node, and the data is transferred to the receiving node data device.

The present invention therefore provides a unique system that allows the transmission of multiple voice signals together with data signals on multiple TDM channels on a DSL line. The present invention gives priority to voice signals and provides clear channels for the duration of the transmission of the voice signal. In addition, open, available channels are only allocated for the transmission of data during the time it takes to actually transmit the data through the system. After the data is transmitted through the system, each of these channels is de-allocated and made available for the transmission of other data signals or voice signals. In this manner, the multiple DSL channels can be shared for the transmission of both voice and data signals and the voice signals can take priority over the transmission of data. Further, data transmissions are spread over all of the available channels which greatly increases the transmission data rate.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention, except insofar as limited by the prior art.

What is claimed is:

1. A system that is capable of routing POTS data from POTS devices and device data from data devices through the Internet, the public switched telephone network, and second remote terminals coupled to a terminal controller as selected by a user, comprising:

first remote terminals connected to said POTS devices and said data devices that read POTS routing information generated by said POTS devices in response to a user generated POTS routing input code entered by said user proximate to a time of use of said POTS devices, said POTS routing input code indicating a POTS routing path, in addition to a POTS destination address, and data device routing information generated by said data devices in response to a user generated data device address containing routing data entered by said user proximate to a time of use of said data devices, and that generate routing control signals in response to said POTS routing information and data device routing information to route said POTS data through said public switched telephone network, said Internet and said second remote terminals in accordance with said user generated POTS routing input code, and to route said device data through said public switched telephone network, said Internet and said second remote terminals in accordance with said user generated data device address;

a processor located in said terminal controller that receives said routing control signals and generates switch control signals in response to said routing control signals;

a switch matrix in said terminal controller that receives said switch control signals, said switch matrix being configured in response to said switch control signals to provide data paths that route said device data and said POTS data, to be routed through the Internet, to an Internet interface, to provide data paths that route said device data and said POTS data, to be routed through said public switched telephone network, to a public switched telephone network interface and to provide data paths that route said device data and said POTS data, to be routed through said second remote terminals, directly to said second remote terminals without going through the public switched telephone network and the Internet.

2. The system of claim 1 further comprising:

special codes that can be entered in said POTS devices to function as said POTS routing information.

3. A switching system that is capable of delivering both device data and POTS data to users that are locally connected to said switching system comprising:

first remote terminals connected to said POTS devices and said data devices that read POTS routing information generated by said POTS devices in response to a user generated POTS routing input code entered by said user proximate to a time of use of said POTS devices, said POTS routing input code indicating a POTS routing path, in addition to a POTS destination address, and data device routing information generated by said data devices in response to a user generated data device address containing routing data entered by said user proximate to a time of use of said data devices, and that generate routing control signals in response to said POTS routing information and data device routing information to route said POTS data through the public switched telephone network, the Internet and second remote terminals in accordance with said user generated POTS routing input code, and to route said device data through said public switched telephone network, said Internet and said second remote terminals in accordance with said user generated data device address;

a terminal controller comprising:
  a processor that receives said routing control signals and generates switch control signals in response to said routing control signals;
  a switch matrix that receives said switch control signals, said switch matrix being configured in response to said switch control signals to provide data paths that route said device data and said POTS data, to be routed through the Internet, to an Internet interface, to provide data paths that route said device data and said POTS data, to be routed through the public switched telephone network, to a public switched telephone network interface, and to provide data paths that route said device data and said POTS data, to be routed from said terminal controller to other data devices and other POTS devices connected to said second remote terminals, to said second remote terminals connected to said other data devices and said other POTS devices without going through said Internet and without going through said public switched telephone network.

4. The system of claim 3 further comprising:
special codes that can be entered in said POTS devices to function as said POTS routing information.

5. A system for transmitting POTS signals and data signals over a multiple channel communication line and routing said POTS signals and said data signals between a network data port and said multiple channel communication line, routing said POTS signals and said data signals between a central office switch and said multiple channel communication line and routing said POTS signals and said data signals between said multiple channel communication line and second remote terminals comprising:
  first remote terminals connected to POTS devices and data devices that read POTS routing information generated by said POTS devices in response to a user generated POTS routing input code entered by a user, said POTS routing input code indicating a POTS routing path, in addition to a POTS destination address, and data device routing information generated by said data devices in response to a user generated data device address containing routing data entered by said user, and that generate routing control signals in response to said POTS routing information and data device routing information to route said POTS signals between said network data port and said multiple channel communication line, between said central office switch and said multiple channel communication line and between said second remote terminals and said multiple channel communication line in response to said user generated POTS routing input code, and to route said data device signals between said network data port and said multiple channel communication line, between said central office switch and said multiple channel communication line and between said second remote terminals and said multiple channel communication line in response to said user generated data device address without connecting to said network data port and without connecting to said central office switch.

6. A method of using a terminal controller as a PBX controller that is capable of delivering both device data from data devices and POTS data from POTS devices to users that are both locally and remotely connected to said terminal controller comprising:
  generating a data device destination address in response to a user input, said data device destination address including a subnet address indicating a data device routing path;
  transmitting said data device destination address to a first remote terminal; generating a POTS device destination address, that includes a POTS device routing code, in response to a user input, said POTS device routing code indicating a POTS device routing path;
  transmitting said POTS device routing code to said first remote terminal;
  reading said data device destination address at said first remote terminal to generate a data device routing message indicating said data device routing path;
  reading said POTS device routing code at said first remote terminal to generate a POTS device routing message indicating said POTS device routing path;
  transmitting said data device routing message and said POTS device routing message to said terminal controller;
  configuring a switch matrix in said terminal controller in response to said data device routing message to create said data device routing path and said POTS device routing message to create said POTS device routing path;
  transmitting said device data through said data device routing path to said data device destination address through a network, whenever said data device destination address indicates network routing, through the public switched telephone network, whenever said data device destination address indicates public switched telephone network routing, and to a second remote terminal that is connected directly to said terminal controller without going through said network and without going through said public switched telephone network, whenever said data device destination address indicates local routing to said second remote terminal;
  transmitting said POTS data through said POTS device routing path to said POTS device destination address through said network, whenever said POTS device routing code indicates network routing, through said public switched telephone network, whenever said POTS device routing code indicates public switched telephone network routing, and to said second remote terminal that is connected directly to said terminal controller without going through said network and without going through said public switched telephone network, whenever said POTS device routing code indicates local routing to said second remote terminal.

7. The method of claim 6 further comprising:
providing special codes that can be entered in POTS devices to function as said POTS device routing code.

8. A system for transmitting POTS signals and data signals over a multiple channel communication line and routing said POTS signals and said data signals between a network data port and said multiple channel communication line, routing said POTS signals and said data signals between a central office switch and said multiple channel communication line and routing said POTS signals and said data signals between said multiple channel communication line and second remote terminals comprising:
  first remote terminals connected to said POTS devices and said data devices that read POTS routing information generated by said POTS devices in response to a user generated POTS routing input code entered by said user proximate to a time of use of said POTS devices, said POTS routing input code indicating a POTS routing path, in addition to a POTS destination address, and data device routing information generated by said data devices in response to a user generated data device address containing routing data entered by said user proximate to a time of use of said data devices, and that generate routing control signals in response to said POTS routing information and data device routing information to route said POTS data through said public switched telephone network, said Internet and said second remote terminals in accordance with said user generated POTS routing input code, and to route said device data through said public switched telephone network, said Internet and said second remote terminals in accordance with said user generated data device address without going through said network data port and without going through said central office switch.

9. A method of routing data to a destination address through a terminal controller comprising:

generating a data device destination address in response to a user input entered in said user data devices, said data device destination address including a subnet address indicating a data device routing path;

transmitting said data device destination address to a remote terminal;

generating a POTS device destination address in response to a POTS user input entered in said POTS devices, said POTS device destination address including said POTS user input indicating a POTS device routing path;

transmitting said POTS device destination address to said first remote terminal;

reading said data device destination address at said remote terminal to generate a data device routing message indicating said data device routing path;

reading said POTS device destination address at said first remote terminal to generate a POTS device routing message indicating said POTS device routing path;

transmitting said data device routing message and said POTS device routing message to said terminal controller;

configuring a switch matrix in said terminal controller in response to said data device routing message to create said data device routing path and said POTS device routing message to create said POTS device routing path;

transmitting said device data through said data device routing path to said data device destination address through a network, whenever said data device destination address indicates network routing, through the public switched telephone network, whenever said data device destination address indicates public switched telephone network routing, and to a second remote terminal that is connected directly to said terminal controller without going through said network and without going through said public switched telephone network, whenever said data device destination address indicates local routing to said second remote terminal;

transmitting said POTS data through said POTS data routing path to said POTS data destination address through said network, whenever said POTS device destination address indicates network routing, through said public switched telephone network, whenever said POTS device destination address indicates public switched telephone network routing, and to said second remote terminal that is connected directly to said terminal controller without going through said network and without going through said public switched telephone network, whenever said POTS device destination address indicates local routing to said second remote terminal;

controlling the provisioning of services to users by testing a multiple channel communication line coupled between said central office terminal controller and a remote terminal to determine the number of channels that are available to each user on said multiple channel communication line;

programming the number of channels paid for by said user on said multiple channel communication line.

10. A method of routing data to a destination address through a terminal controller comprising:

generating a data device destination address in response to a user input entered in said user data devices, said data device destination address including a subnet address indicating a data device routing path;

transmitting said data device destination address to a remote terminal;

generating a POTS device destination address in response to a POTS user input entered in said POTS devices, said POTS device destination address including said POTS user input indicating a POTS device routing path;

transmitting said POTS device destination address to said first remote terminal;

reading said data device destination address at said remote terminal to generate a data device routing message indicating said data device routing path;

reading said POTS device destination address at said first remote terminal to generate a POTS device routing message indicating said POTS device routing path;

transmitting said data device routing message and said POTS device routing message to said terminal controller;

configuring a switch matrix in said terminal controller in response to said data device routing message to create said data device routing path and said POTS device routing message to create said POTS device routing path;

transmitting said device data through said data device routing path to said data device destination. address through a network, whenever said data device destination address indicates network routing, through the public switched telephone network, whenever said data device destination address indicates public switched telephone network routing, and to a second remote terminal that is connected-directly to said terminal controller without going through said network and without going through said public switched telephone network, whenever said data device destination address indicates local routing to said second remote terminal;

transmitting said POTS data through said POTS data routing path to said POTS data destination address through said network, whenever said POTS device destination address indicates network routing,.through said public switched telephone network, whenever said POTS device destination address indicates public switched telephone network routing, and to said second remote terminal that is connected directly to said terminal controller without going through said network and without going through said public switched telephone network, whenever said POTS device destination address indicates local routing to said second remote terminal.

* * * * *